United States Patent
Zarubica et al.

(10) Patent No.: US 11,677,425 B2
(45) Date of Patent: Jun. 13, 2023

(54) SYSTEMS AND METHODS FOR DECENTRALIZED LINK PERFORMANCE

(71) Applicant: L3Harris Technologies, Inc., Melbourne, FL (US)

(72) Inventors: Radivoje Zarubica, Sandy, UT (US); Jeffrey B. Bench, Lehi, UT (US); Brent A. Kenney, Bountiful, UT (US); Philip M. Hirz, Holladay, UT (US); Thomas R. Giallorenzi, Sandy, UT (US); Brian J. Thorp, Sandy, UT (US); James E. Hawker, Herriman, UT (US); Lee F. Carter, Salt Lake City, UT (US); Marley D. Hamblin, Kaysville, UT (US); Edwin R. Twitchell, Fruit Heights, UT (US); Rhett B. McCarthy, Riverton, UT (US)

(73) Assignee: L3HARRIS TECHNOLOGIES, INC., Melbourne, FL (US)

(*) Notice: Subject to any disclaimer, the term of this patent is extended or adjusted under 35 U.S.C. 154(b) by 0 days.

(21) Appl. No.: 17/500,569

(22) Filed: Oct. 13, 2021

(65) Prior Publication Data

US 2023/0112645 A1    Apr. 13, 2023

(51) Int. Cl.
*H04B 1/10* (2006.01)
*H04B 17/336* (2015.01)

(52) U.S. Cl.
CPC ......... *H04B 1/1027* (2013.01); *H04B 17/336* (2015.01)

(58) Field of Classification Search
CPC ............. H04B 1/71072; H04B 1/0475; H04B 1/1027; H04B 17/336; H04B 10/07955; H04B 2201/709718; H04B 7/0857
See application file for complete search history.

(56) References Cited

U.S. PATENT DOCUMENTS 7,120,138 B2    10/2006  Soomro et al.
7,526,461 B2     4/2009  Srinivasa et al.
(Continued)

FOREIGN PATENT DOCUMENTS

JP        4142451 B2    9/2008
KR      100824949 B1    4/2008
(Continued)

OTHER PUBLICATIONS

Haykin, et. al, Spectrum Sensing for Cognitive Radio, Proceedings of the IEEE, vol. 97, No. 5, May 2009.
(Continued)

*Primary Examiner* — Nhan T Le
(74) *Attorney, Agent, or Firm* — Fox Rothschild LLP

(57) ABSTRACT

Systems and methods for evaluating link performance over a multitude of frequencies for Signal-to-Noise Ratio (SNR) optimization and mitigating interference. The methods comprise: communicating, from a first communication device, a first signal over a given channel in a given frequency band; receiving, by the first communication device, spectral power measurements and a Signal-to-Total Power Ratio (STPR) estimate determined based on a second signal including the first signal combined with at least one of noise and one or more interference signals (the STPR estimate accounts for the receiver performance including chip rate processing gain and/or the performance of an interference cancellation circuit used to remove the interference signals from the second signal); and determining, by the first communication device, a predicted Signal-to-Noise Ratio (SNR) condition for a plurality of frequencies within the given frequency band using the STPR estimate and the spectral power measurements.

38 Claims, 15 Drawing Sheets

(56) References Cited

U.S. PATENT DOCUMENTS

| | | | |
|---|---|---|---|
| 8,391,192 B2 | 3/2013 | Prakash et al. | |
| 8,494,464 B1 | 7/2013 | Kadambe et al. | |
| 8,688,065 B2* | 4/2014 | Young | H04B 17/336 |
| | | | 455/226.4 |
| 9,521,680 B2* | 12/2016 | Jovicic | H04W 72/082 |
| 10,122,479 B2 | 11/2018 | Dzierwa | |
| 10,462,796 B2* | 10/2019 | Frenne | H04L 25/0204 |
| 10,644,815 B2 | 5/2020 | Kleinbeck et al. | |
| 11,303,313 B2* | 4/2022 | Hsieh | H04B 1/1036 |
| 2006/0140251 A1 | 6/2006 | Brown et al. | |
| 2015/0230105 A1 | 8/2015 | Negus et al. | |

FOREIGN PATENT DOCUMENTS

| | | |
|---|---|---|
| KR | 101701441 B1 | 2/2017 |
| WO | 9939472 | 8/1999 |

OTHER PUBLICATIONS

Quan, et. al, Collaborative Wideband Sensing for Cognitive Radios, IEEE Signal Processing Magazine, Nov. 2008.
Chowdury, et. al, Cognitive Wireless Mesh Networks with Dynamic Spectrum Access, Jan. 2008.
Extended European Search Report for European Patent Application No. 22 20 1296, dated Mar. 17, 2023 (10 pages).

* cited by examiner

STEP Message Example Fields

| Message Block | Data Field | Field Qty | Notes/Descriptions |
|---|---|---|---|
| HEADER | Type | 1 | Type of message |
| | Version | 1 | Version of the message |
| | Sequence Number | 1 | Local node generates this number |
| | Number of Bands | 1 | Number of bands represented by the STEP message. The value defines the number of band header/payload pairs in the message. |
| | Number of Neighbors | 1 | Number of neighbors in the PAR message. This value defines how many channel STPR blocks in the message. |
| | Sender Node ID | 1 | Node ID of the local node |
| | Reserved | 1 | N/A |
| STPR DATA | Neighbor Unique ID | # of Neighbors | Node ID of the remote node |
| | Channel STPR | # of Neighbors | Remote channel STPR |
| BAND HEADER | Number of Valid Bins | 2 | Number of valid bins in the FDD band of interest, per band. |
| | Frequency Start (MHz) | 2 | Lower frequency of first valid frequency bin. |
| | Frequency Stop (MHz) | 2 | Upper frequency of last valid frequency bin. |
| | Spectral Bin Size (bits) | 2 | Number of quantization bits used for the spectral power estimates. |
| | Number of Jammer Signals | 2 | Number of detected pulse jammers. |
| | Jammer Quantization (bits) | 2 | Number of bits used to quantize the pulse width and duty cycle of the discovered jammers. |
| | Noise Figure Offset (dB) | 2 | Offset from a reference Noise Figure in the band |
| BAND PAYLOAD | Spectral Power (dB) (Per Bin) | # of Valid Bins | Normalized power level of the measured spectrum data in dB, per bin. |
| | Start Bin (Per Jammer) | # of Jammers | Start bin of the jammer signal. |
| | Stop Bin (Per Jammer) | # of Jammers | Stop bin of the jammer signal |
| | Jammer Type (Per Jammer) | # of Jammers | Type of jammer (enumeration). |
| | Pulse Width (Per Jammer) | # of Jammers | Measured pulse width of the jammer. |
| | PRI (Per Jammer) | # of Jammers | Measured PRI of the jammer. |

FIG. 11

SYSTEMS AND METHODS FOR DECENTRALIZED LINK PERFORMANCE

BACKGROUND

Statement of the Technical Field

The present disclosure relates generally to communication systems. More particularly, the present disclosure relates to implementing systems and methods for decentralized link performance.

Description of the Related Art

Mesh networks comprise network nodes that communicate signals to/from each other over communication channels. The network nodes may experience interference resulting from other communication signals. This interference can degrade performance of the network nodes.

SUMMARY

The present disclosure concerns implementing systems and methods for evaluating link performance over a multitude of frequencies for Signal to Noise Ratio (SNR) optimization and mitigating interference. The methods comprise: communicating, from a first communication device, a first signal over a given channel in a given frequency band; receiving, by the first communication device, (i) a Signal-to-Total Power Ratio (STPR) estimate determined based on a second signal (e.g., a signal including the first signal combined with at least one of noise and one or more interference signals (e.g., jamming signals)) (the STPR estimate accounts for the receiver performance including chip rate processing gain, and in some scenarios the performance of an interference cancellation circuit used to remove the interference signals from the second signal) and (ii) spectral measurement(s) based on the second signal; and determining, by the first communication device, a predicted Signal-to-Noise Ratio (SNR) condition for a plurality of frequencies within the given frequency band using the STPR estimate and the spectral measurement(s). The first communication device can: select a channel from a plurality of channels over which signals should be sent based on the predicted SNR condition; and perform operations to communicate information over the selected channel.

The STPR estimate is a function of (i) a ratio $P_{ratio,exc}$ of an output signal power and an input signal power of an interference cancellation circuit and (ii) a mask ratio $M_{ratio,exc}$ representing a percentage of the first signal remaining from the second signal by the interference cancellation circuit. The STPR estimate is set equal to $((P_{ratio,exc}/M_{ratio,exc})\cdot\gamma)/(\gamma+(R_c/R_b))$, where $\gamma$ is an SNR of the second signal after the interference cancellation circuit, $R_c$ is a chipping rate for the given channel, and $R_b$ is an information bit rate corresponding to $\gamma$. The SNR comprises an Eb/N0 that takes into account a rate.

It should be noted that the method and STPR estimate can be used for receivers that do and do not have an excision circuit. In scenarios where a receiver does not comprise an excision circuit, the STPR calculation does not include the $P_{ratio,exc}$ and the $M_{ratio,exc}$ estimates. Similarly, this is equal to the case where a receiver with an excision circuit has nothing to excise; therefor $P_{ratio,exc}$ and $M_{ratio,exc}$ would both be equal to 1.0. In the case where the receiver does not have an excision circuit, the predicted Eb/N0 calculation may use mathematical equations (26) and (27) described below.

The predicted SNR condition is determined by removing a known power of the first signal from a total spectral power measured at a receiver. The known power of the first signal is obtained by multiplying the STPR estimate by a sum of a total spectrum over given frequency bins or Discrete Fourier Transform (DFT) bins. The total spectral power is specified by summing the relevant spectral power estimates measured across the given frequency band as the second signal is being received. The spectral power estimates can comprise a DFT. At least some of the spectral power estimates comprise information for the interference signals. Other references in the detailed description to Fast Fourier Transform (FFT) comprise an embodiment of the spectral power estimate calculation and do not limit the wider use of the DFT for the same purpose.

The spectral power estimates may be scaled by the inverse of the duty cycles of the interference signals. In some scenarios, the scaled spectral power estimates may be used to predict whether the interference cancellation circuit can excise a given interference signal from the second signal. A power of the given interference signal may be removed from the scaled spectral power estimates when a prediction is made that the interference cancellation circuit can excise the given interference signal from the second signal.

The implementing systems comprise a processor, and/or a non-transitory computer-readable storage medium comprising programming instructions that are configured to cause the processor to implement a method for operating the same.

The present document also concerns a communication device. The communication device comprises: a transceiver configured to receive signals transmitted over channels in frequency bands; and a circuit configured to (i) determine multiple sets of spectral information and temporal information for each said frequency band, (ii) determine excision metrics for each said received signal, (iii) use the temporal information to determine interference signal information, and (iv) facilitate interference mitigation at another communication device using the sets of spectral information and temporal information, excision metrics and interference signal information.

The circuit is further configured to determine an STPR estimate based on a received signal including a signal of interest combined with interference signals and/or noise. The STPR estimate accounts for the receiver performance including chip rate processing gain, and in some scenarios the performance of an interference cancellation circuit used to remove the interference signals from the received signal. The STPR estimate is a function of (i) a ratio $P_{ratio,exc}$ of an output signal power and an input signal power of an interference cancellation circuit and (ii) a mask ratio $M_{ratio,exc}$ representing a percentage of the first signal remaining from the second signal by the interference cancellation circuit. The STPR estimate is set equal to $((P_{ratio,exc}/M_{ratio,exc})\cdot\gamma)/(\gamma+(R_c/R_b))$, where $\gamma$ is a Signal-to-Noise Ratio (SNR) of the second signal after the interference cancellation circuit, $R_c$ is a chipping rate for the given channel, and $R_b$ is an information bit rate corresponding to $\gamma$. The SNR comprises an Eb/N0 that takes into account a rate.

The spectral information comprises a total spectral power of the received signal that is specified by spectral power estimates measured across a given frequency band as the signal is being received. The spectral power estimates may comprise an FFT. At least some of the spectral power estimates comprise information for the interference signals. The spectral power estimates facilitate a prediction as to whether the interference cancellation circuit can excise a given interference signal of the interference signals from the received signal.

BRIEF DESCRIPTION OF THE DRAWINGS

The present solution will be described with reference to the following drawing figures, in which like numerals represent like items throughout the figures.

FIG. 11 provides a table showing an illustrative format for the STEP message.

DETAILED DESCRIPTION

Figure 1:
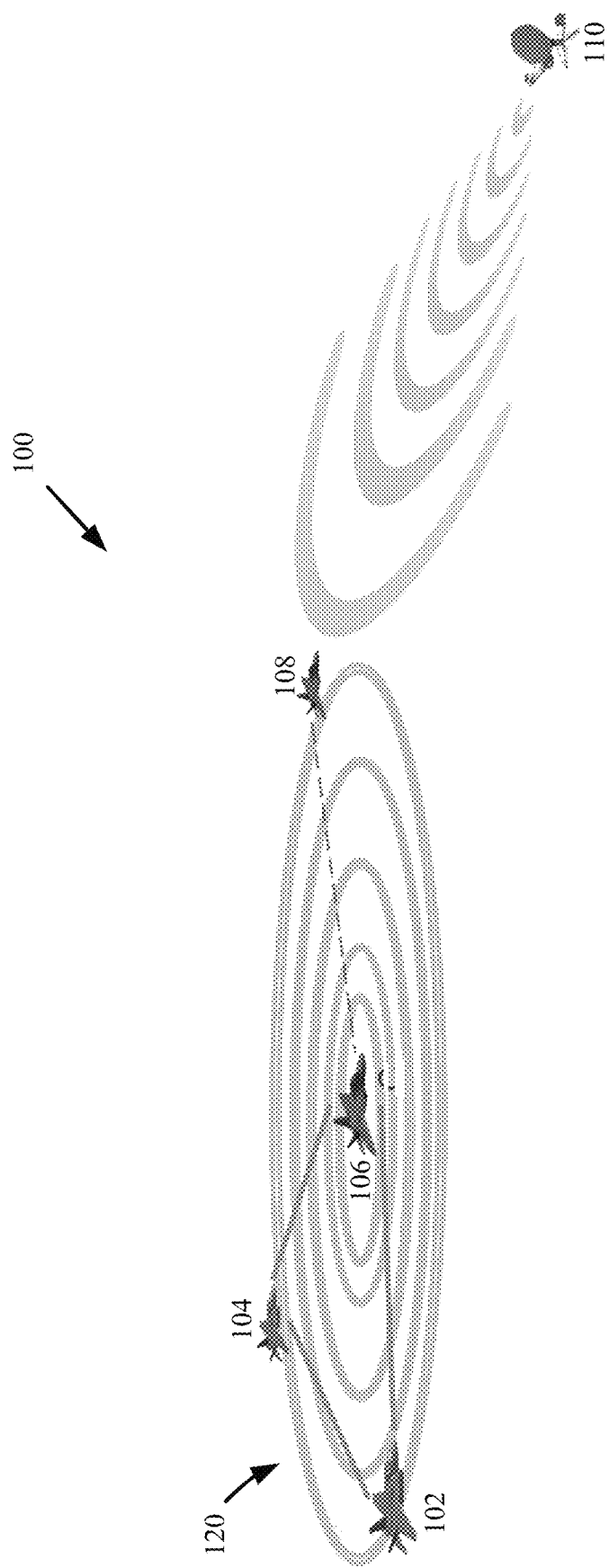
FIGS. 1-2 provide illustrations of an illustrative system implementing the present solution.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning, the likeliness of, and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Referring to FIG. 1, there is provided an illustration of a system 100. System 100 comprises a communication network 120 in which a plurality of network nodes 102, 104, 106, 108 communicate with each other. The communication network includes a mesh network (e.g., a Code Division Multiple Access (CDMA) network, a Frequency Division Multiple Access (FDMA) network, or a combination thereof) or any other network in accordance with a given application.

Figure 2:
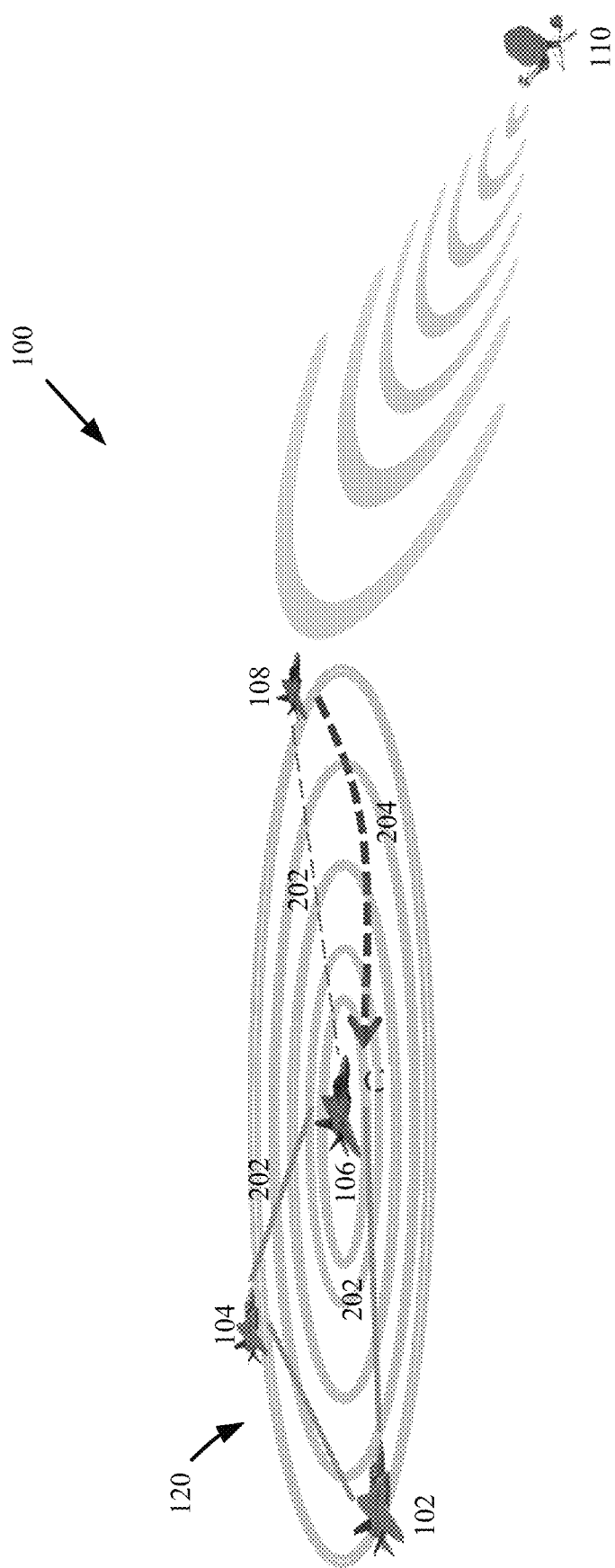

During operation, a network node 106 generates and transmits one or more signals 202 over communication channel(s), as shown in FIG. 2. The signal(s) 202 can include, but are not limited to, communication signals (e.g., traffic channels) and control signals (e.g., beacon signals). The signal(s) 202 is(are) received by another network node(s) 102, 104, 108. In response to the signal(s) 202, network node(s) generate(s) and send(s) responsive signal(s) 204 to network node 106 to facilitate mitigation interference from signal(s) transmitted by an interferer 110. The interfering signals can unintentionally and/or intentionally introduce interference into the communication channel(s) of the communication network 120.

The interference mitigation is facilitated by estimating an SINR for all potential frequency locations using a composite picture of the spectrum provided by the desired one-hop neighbor(s) (e.g., node 108 is a one-hop neighbor to node 106). Spectral information, relative power estimates, and SNR feedback are sent in the signal(s) 204 from the receiving network node (e.g., node 108) to node 106. It should be noted that, in some scenarios, the receiving network node produces spectral information, relative power estimates, and SNR (e.g., Eb/N0) feedback for one or more transmitting nodes.

Node 106 uses this information to determine predicted SNR conditions for every frequency bin in each receive band of the network 120. The predicted SNR conditions are then used for channel selection (e.g., select a channel in which interference by the interferer 110 will not occur or be minimal). Once a channel has been selected, node 106 performs operations to communicate information over the same. This process may be repeated in accordance with a given application.

Figure 3:
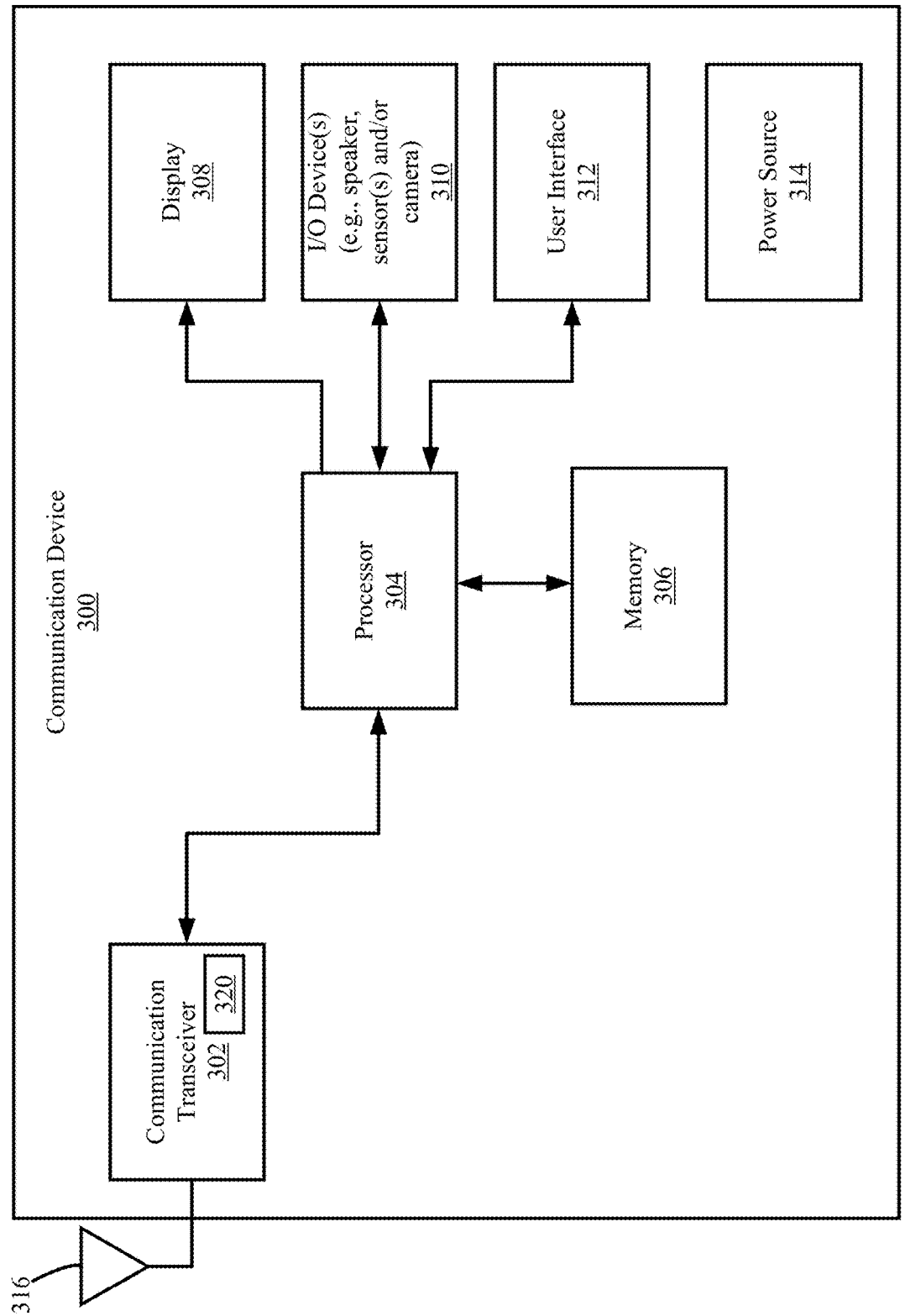
FIG. 3 provides an illustration of an architecture for a communication device.

Referring now to FIG. 3, there is provided an illustration of an illustrative architecture for a communication device 300 which is configured for carrying out the various methods described herein for mitigating the signal interference. Network nodes 104-108 of FIGS. 1-2 are the same as or similar to communication device 300. As such, the discussion provided below in relation to communication device 300 is sufficient for understanding network nodes 104-108 of FIGS. 1-2. Communication device 300 can include more or less components than that shown in FIG. 3 in accordance with a given application. For example, communication device 300 can include one or both components 308 and 310. The present solution is not limited in this regard.

As shown in FIG. 3, the communication device 300 comprises a communication transceiver 302 coupled to an antenna 316. The communication transceiver can comprise one or more components such as a processor, an application specific circuit, a programmable logic device, a digital signal processor, or other circuit programmed to perform the functions described herein. The communication transceiver 302 can enable end-to-end communication services in a manner known in the art. In this regard, the communication transceiver can facilitate communication of data (e.g., voice data and/or media content) from the communication device 300 over a network (e.g., mesh network 120 of FIGS. 1-2) and/or communications channel.

The communication transceiver 302 can include, but is not limited to, a radio transceiver, a satellite transceiver, and/or a cellular network communication transceiver. The communication transceiver 302 can include an interference cancellation circuit 320 to remove interference signals from received signals. Interference cancellation circuits are well known, and are also referred to as excision circuits. Any interference cancellation circuit or excision circuit can be used here.

The communication transceiver 302 is connected to a processor 304 comprising an electronic circuit. During operation, the processor 304 is configured to control the communication transceiver 302 for providing communication services. The processor 304 also facilitates mitigation of interference to signals. The manner in which the processor facilitates interference mitigation will become evident as the discussion progresses.

A memory 306, display 308, user interface 312 and Input/Output (I/O) device(s) 310 are also connected to the processor 304. The processor 304 may be configured to collect and store data generated by the I/O device(s) 310 and/or external devices (not shown). The I/O device(s) 310 can include, but are not limited to, a speaker, a microphone, sensor(s) (e.g., a temperature sensor and/or a humidity sensor), and/or a camera. Data stored in memory 306 can include, but is not limited to, one or more look-up tables or databases which facilitate selection of communication channels and/or communication groups. The user interface 312 includes, but is not limited to, a plurality of user depressible buttons that may be used, for example, for entering numerical inputs and selecting various functions of the communication device 300. This portion of the user interface may be configured as a keypad. Additional control buttons and/or rotatable knobs may also be provided with the user interface 312. A power source 314 (e.g., a battery and/or energy harvester) may be provided for powering the components of the communication device 300. The battery may comprise a rechargeable and/or replaceable battery.

The communication device architecture shown in FIG. 3 should be understood to be one possible example of a communication device system which can be used in connection with the various implementations disclosed herein. However, the systems and methods disclosed herein are not limited in this regard and any other suitable communication device system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the illustrative system is applicable to software, firmware, and hardware implementations.

Figure 4:
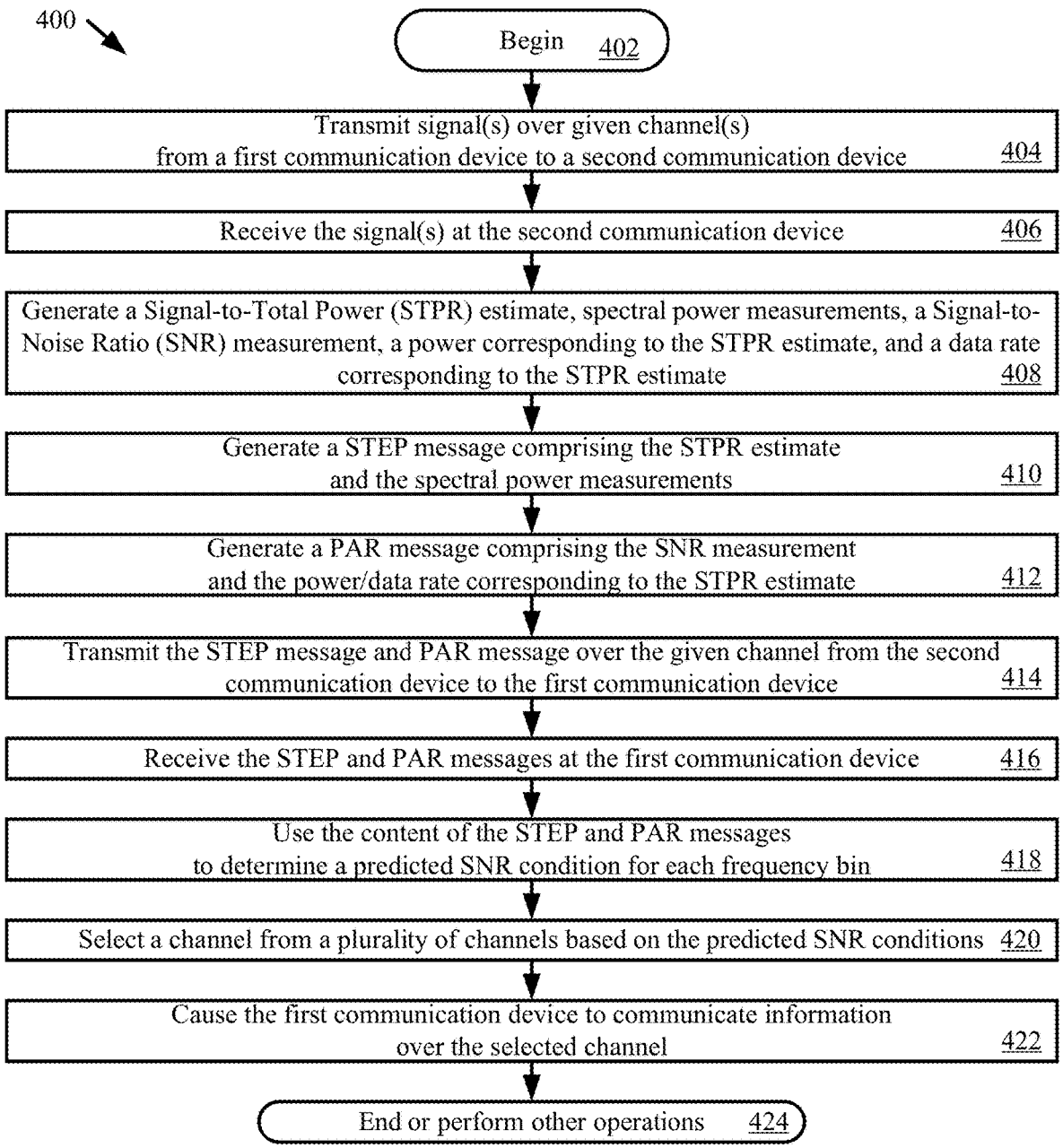
FIG. 4 provides a flow diagram of an illustrative method for creating and exchanging STEP information to estimate SNR over a range of frequencies in a communication network.
Figure 5:
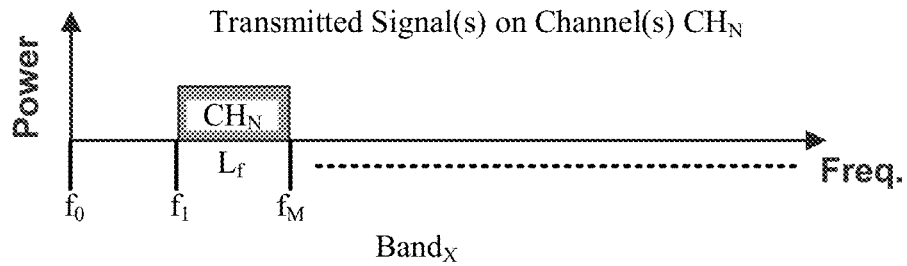
FIG. 5 provides a graph showing signal(s) being transmitted on communication channel(s) from a first network node to a second network node.

Referring now to FIG. 4, there is provided a flow diagram of an illustrative method 400 for operating nodes in a communication network (e.g., network 120 of FIGS. 1-2). Method 400 begins with 402 and continues with 404 where signal(s) is(are) transmitted over given channel(s) from a first communication device (e.g., network node 106 of FIGS. 1-2) to a second communication device (e.g., network node 108 of FIGS. 1-2). The signal(s) can include communication signals (e.g., traffic signals) and/or control signals (e.g., beacon signals). A graph is provide in FIG. 5 showing signal(s) transmitted at a frequency location $L_f$ on communication channel(s) $CH_N$ (e.g., traffic channel(s) and/or a beacon channel(s)). The frequency location $L_f$ resides between frequency $f_1$ and frequency $f_m$.

In 406, the signal(s) is(are) received at the second communication device. The second communication device then performs operations in 408 to estimate, compute or otherwise determine a plurality of metrics for each channel over which a signal was sent by the first communication device. The metrics include, but are not limited to, an STPR estimate, a power corresponding to the STPR estimate, a data rate corresponding to the STPR estimate, an SNR measurement and spectral power measurements. The spectral power measurements can include, but are not limited to, the power per frequency bin. Components of the spectral power measurements include, but are not limited to, a power of a Signal-Of-Interest (SOI) (i.e., a signal sent from the first communication device), a power of each interfering signal, and a power of a noise signal. The manner in which the metrics are estimated, computed or otherwise determined will become evident as the discussion progresses.

Figure 6:
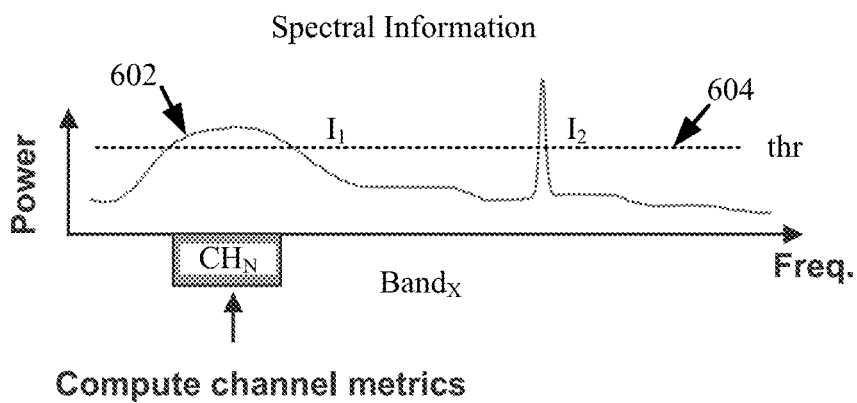
FIG. 6 provides a graph showing spectral information generated by a receiving network node.

Graphs are provided in FIGS. 5-6 showing (i) the location of the signal transmission over a channel $CH_N$ in a frequency space of a given receive frequency band $Band_x$ and (ii) a plot 602 of spectral power estimates that the second communication device measures across the receive frequency band Band$_x$. The spectral power estimates can be obtained using an FFT based algorithm. The FFT based algorithm generally converts the received signal from an original domain (e.g., time or space) to a frequency domain. The output of the FFT based algorithm is a plurality of frequency or FFT bins. Each frequency or FFT bin represents the signal strength at a time when the received signal was sampled. Thus, each FFT bin provides both spectral and temporal information about the received signal. The FFT bins for the received signal are collectively referred to herein as an FFT for the receive frequency band. An FFT for each receive frequency band can be determined by the second communication device. The power of the received signal is measured at each frequency sample time. The signal power can be plotted versus the frequencies of the FFT bins. Plot 602 of FIG. 6 illustrates the received signal power plotted versus the frequency of the receive frequency band Band$_S$ that the second communication device is monitoring. Note that the second communication device is monitoring a wider frequency band than that of each channel CH$_N$. I$_1$ and I$_2$ illustrate where interfering signals are located in frequency space, and that may be flagged as the frequency spectrum is monitored.

Once the metrics are obtained, the second communication device (e.g., network node 108 of FIGS. 1-2) generates at least one message as shown by 410-412. In some scenarios, the message(s) comprise(s) a Spectral Temporal Energy and Position (STEP) message as shown by 410 and/or a Power and Rate (PAR) message as shown by 412. The STEP message provides a means to allow the network to perform both intra-band and inter-band frequency agility in the presence of interference (e.g., jamming). The four words in the STEP acronym describe the 6-dimensional plane of operations that the network nodes may utilize. Three of the dimensions are created with a fast time-varying FFT as noted above in relation to 408, and the other three dimensions rely on accurate position estimates to represent 3-dimensional space.

Spectral—Representing the ability to see the frequency spectrum within two receive bands simultaneously.
Temporal—Representing the ability to see time-domain changes over the spectral, energy, and position information.
Energy—Characteristic to detect the power within the frequency spectrum over both receive bands simultaneously.
Position—The ability to use position information (latitude, longitude, altitude, azimuth, elevation, and range) to understand the 3-dimensional space between nodes in the network.

The present solution is not limited to the particulars of these scenarios.

Both the STEP message and the PAR message comprise a data header portion and a payload portion. The payload portion of the STEP message comprises the STPR estimates, the spectral power measurements, and jammer information. All of this information is provided for each receive band. The payload portion of the PAR message comprises the SNR measurement, the power corresponding to the STPR estimate, and the data rate corresponding to the STPR estimate. The STEP and PAR messages can have any protocol format in accordance with a given application. The STEP and PAR messages are transmitted in 414 over a given channel from the second communication device to the first communication device (e.g., network node 106 of FIGS. 1-2).

In 416, the STEP and PAR messages are received by the first communication device (e.g., network node 106 of FIGS. 1-2). The first communication device uses the content of the received messages to determine a predicted SNR condition for each frequency bin in each receive band of the network, as shown by 418. The manner in which the predicted SNR conditions are determined will become evident as the discussion progresses.

Figure 7:
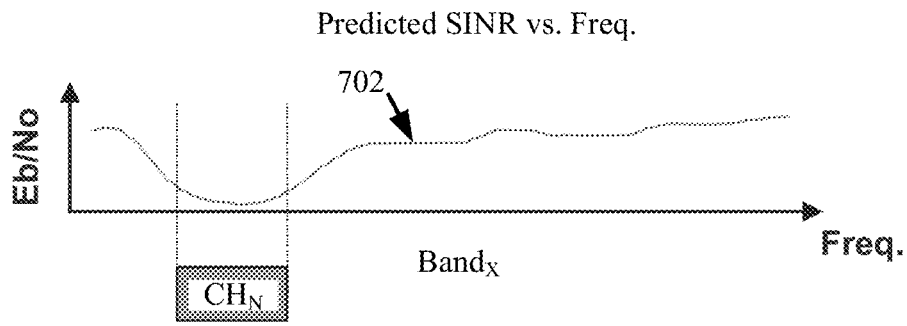
FIG. 7 provides a graph plotting a Signal-to-Interference-plus-Noise Ratio (SINR) verse frequency for a given communication channel.

A graph is provided in FIG. 7 showing a plot 702 of signal performance metrics computed by the first computing device across the frequency band Band$_x$. The signal performance metrics include predicted Eb/N0 conditions for a given channel in the frequency band Band$_x$. Each predicted SNR condition may be expressed as the energy-per-bit to noise-power-spectral-density ratio (Eb/N0) over the frequency band Band$_x$. Thus, each predicted SNR condition may be represented by the plot 702 of FIG. 7, and may be generated for each channel. Note that a communication channel (e.g., traffic channel) and a control channel (e.g., beacon channel) may have different data rates. For example, information may be received faster on a communication channel than on a control channel. Thus, the communication channel information of a given plot (e.g., plot 702) may be used to scale information for the control or other channel(s). The present solution is not limited to the particulars of this example.

Referring again to FIG. 4, the predicted SNR conditions (e.g., of plot 702) are used in 420 for channel selection/assignment purposes. Once a channel has been selected from a plurality of channels based on the predicted SNR conditions, the first communication device is caused to communicate information over the selected channel, as shown by 422. Subsequently, 424 is performed where method 400 ends or other operations are performed (e.g., return to 402).

Figure 8:
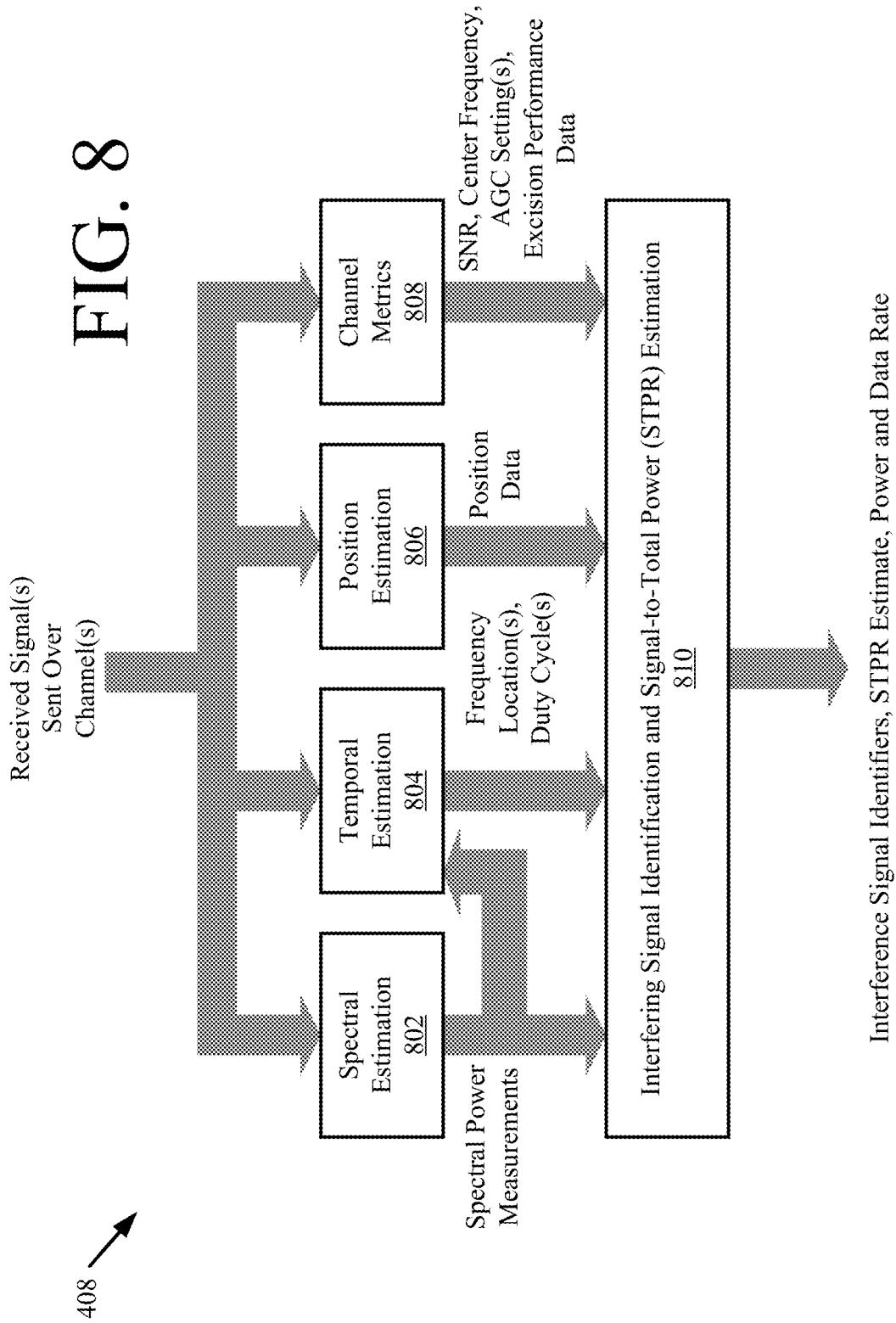
FIG. 8 provides an illustration that is useful for understanding how metrics are determined at a receiving network node in accordance with the present solution.

Referring now to FIG. 8, there is provided an illustration that is useful for understanding the operations of block 408 in FIG. 4. At the second communication device (e.g., network node 108 of FIGS. 1-2), the received signal(s) is (are) processed to determine a plurality of metrics. The metrics are determined in accordance with operations of functional blocks 802-810. Generally, these operations involve: computing multiple sets of spectral information and temporal information (e.g. via a real-time FFT algorithm) for each receive frequency band; determining or otherwise gathering excision metrics for each received signal (traffic and/or beacon); and using the temporal information to determine interference signal information. As noted above, this information is used to generate a STEP message which is sent from the second communication device (e.g., network node 108 of FIGS. 1-2) to the first communication device (e.g., network node 106 of FIGS. 1-2) to facilitate interference mitigation.

In functional block 802, the second communication device determines a spectral estimation for each receive frequency band Band$_x$. The spectral estimation represents a power spectrum across the receive frequency band Band$_x$. More specifically, a spectral power is estimated using an FFT algorithm. FFT algorithms for spectral power estimations are well known. For example, the spectral power estimates are computed using a real-time FFT using post Analog-to-Digital Converter (ADC) samples. One FFT is computed for each receive frequency band. The FFT computation(s) are used to measure spectral power changes over time. The FFT computations may be averaged, quantized and/or scaled in accordance with a given application. Illustrative spectral power estimates are shown plotted on the graph of FIG. 6. The spectral power estimates each define a dot on plot 602. Each dot of plot 602 represents a plotted spectral power estimate comprising an average power value over a given window of time. In this regard, it should be noted that the FFT provides amplitude values for each FFT bin. The average power value can comprise the mean squared amplitude at each FFT bin.

In functional block 804, the second communication device determines temporal power estimations for the interference signal(s). The temporal power estimates do not contain actual power values, but they are quantized to a single bit as a representation of spectral power that has exceeded a defined threshold. This threshold is used to determine whether an interference signal is present or not in a received signal. For every spectral power bin that is above the defined threshold, the result will be a '1' in that bin. For any bin that doesn't exceed the threshold, a '0' is placed in the bin. These quantized values are used to calculate the pulse-width (PW) and the pulse repetition interval (PRI) of interference signals that present themselves in the FFT data. The threshold that is used to quantize the FFT data can be defined per bin. The threshold value may be automatically adjusted based on the information provided via the spectral power estimates. Finally, the FFT data used to provide temporal power estimate values is not averaged, or averaged very little such that the response of the FFT data over time can be clearly determined. These operations can be further understood with reference to FIG. 6.

In FIG. 6, a horizontal line 604 is shown to represent the threshold value used during the comparison operations of 804. The present solution is not limited in this regard. In other scenarios, the threshold value is variable or adaptive, and thus the line would not be linear (e.g., instead would be curved along the frequency axis). The results of the comparison operations are analyzed to determine frequency location(s) of interference signal(s) and identify pulse characteristic(s) (e.g., a duty cycle) for the interference signal(s). For example, the comparison operations are performed to determine when the power is 'on' (e.g., above the thr) and 'off' (e.g., below the thr) during the given time interval(s) for interference signals I1 and I2. Every frequency bin (generated by the FFT algorithm in 802) associated with an 'on' power is assigned a '1' value, while every frequency bin (generated by the FFT algorithm in 802) associated with an 'off' power is assigned a '0' value. These values are used to determine what might be considered an interference signal and to also determine the duty cycle of the interference signal(s). The '1' and '0' values define start/stop FFT bins which represent the frequency locations where interference signal(s) reside in frequency band $Band_x$. The frequency locations are then used to compute a Pulse-Width (PW) estimate and a Pulse-Repetition Interval (PRI) estimate for any interference signal that may be pulsed. The PW and PRI estimates can then be used to compute the duty cycle of the pulses, which is a useful metric to describe the average on/off time of the interference signal. The duty cycle is the fraction of a time period in which a signal is active, and may be expressed as a percentage or ratio. Thus, the duty cycle can be expressed as the percentage of '1' values. The present solution is not limited to the particulars of this example.

In functional block 806, the second communication device determines a position estimation. Techniques for determining positions of communication devices are well known. In some scenarios, a Global Positioning System (GPS) is used to determine the position estimation. Thus, the position estimation comprises GPS data. The present solution is not limited in this regard.

In functional block 808, the second communication device (e.g., network node 108 of FIGS. 1-2) determines channel metrics. The channel metrics include, but are not limited to, a center frequency for a given receive channel, Automatic Gain Control (AGC) settings, an SNR of a received signal, and narrow band excision performance metrics from an excision circuit (e.g., circuit 320 of FIG. 3) of the second communication device (e.g., network node 108 of FIGS. 1-2). Excision circuits are well known for identifying, extracting and removing interference signals from received signals. The center frequency of the given channel comprises a measure of a central frequency between an upper and low cutoff frequencies. Techniques for determining center frequencies of channels are well known. AGC is a regulating circuit of an amplifier or chain of amplifiers for ensuring that a suitable signal amplitude is maintained for the ADC despite amplitude changes in the input signal. The AGC settings are well known, and can include a maximum gain that can be applied to any signal by amplifier(s).

Figures 9A, 9B, 9C:
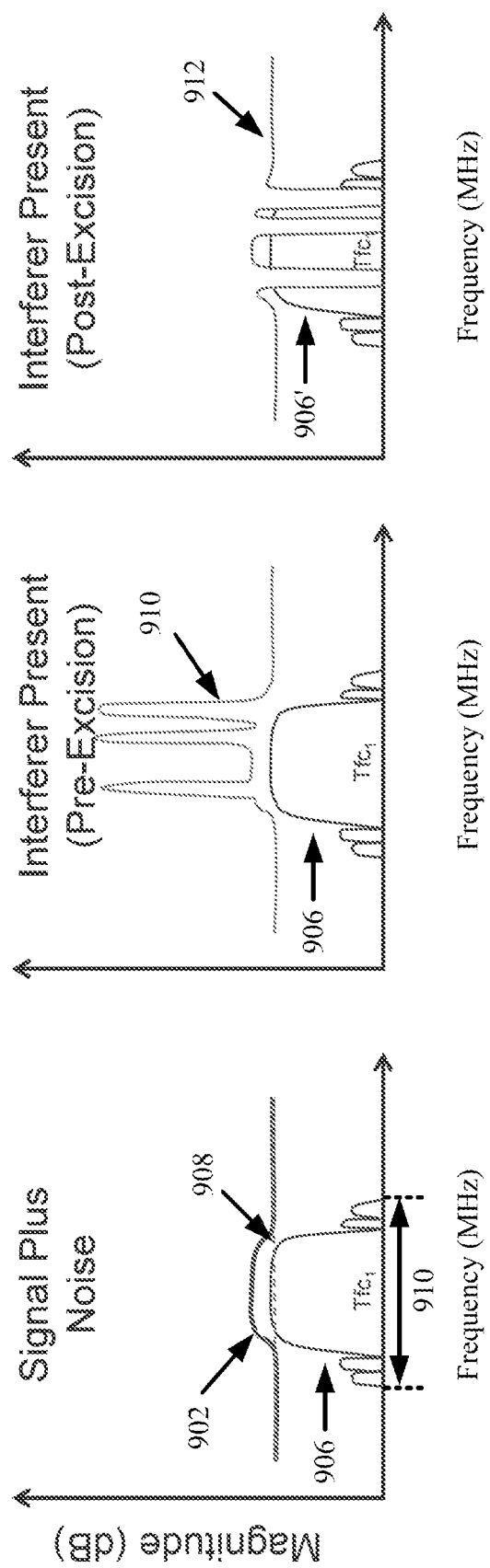
FIGS. 9(a)-9(c) (collectively referred to herein as "FIG. 9") provides graphs that are useful for understanding how an STPR metric is determined by a network node in accordance with the present solution.

The narrow band excision performance metrics specify the performance of the excision circuit of the second communication device. Illustrative excision circuits are shown and described in U.S. Ser. No. 17/372,207 filed on Jul. 9, 2021. The excision circuits are generally configured to excise and subtract (or otherwise remove) interference signals from an input signal. A graph is provided in FIG. 9(b) showing an illustrative signal 910 input into an excision circuit of the second communication device. Signal 910 represents the combination of an SOI 906 of FIG. 9(a), noise with noise floor 908 of FIG. 9(a) and an interference signal. A graph is provided in FIG. 9(c) showing an illustrative signal 912 output from the excision circuit.

Performance of such excision circuits can be expressed as (i) a ratio $P_{ratio,exc}$ of the output signal's power and the input signal's power (e.g., the sum of the power of signal 912 of FIG. 9(c) divided by the sum of the power of signal 910 of FIG. 9(b)) and/or (ii) a mask ratio $M_{ratio,exc}$ representing a percentage of the SOI that remains from the received signal after the excision circuit (e.g., one minus the sum of SOI 906' of FIG. 9(c) divided by the sum of the SOI 906 of FIG. 9(b)). However, because 906 and 906' are not generally available as independent measurements from the total signal power, this calculation can be obtained by counting the number of bins not excised and dividing by the total number of bins. Alternatively, $M_{ratio,exc}$ is also equal to one minus the quantity of the number of excised bins divided by the total number of bins.

Referring again to FIG. 8, the information determined/computed in functional blocks 802-808 is provided to functional block 810. In 810, the spectral and temporal data is used to determine interference signal characteristics such as a pulse width time for each interference signal and a PRI for each interference signal. The PRI comprises the period of time between successive pulses. Next, interference signal identifiers (IDs) are defined. Each interference signal ID comprises a frequency location, a duty cycle, a PW, and a PRI for a given interference signal.

Operations are also performed in functional block 810 to determine an STPR estimate, power and data rate. The STPR estimate calculation is uniquely configured to account for receiver excision capability. The STPR estimate is computed using the spectral data from the temporal estimation functional block 804, channel SNR (Eb/N0) measurements, and excision data. The STPR estimate value is computed for every receive channel. The STPR estimate may be converted to a log domain, and/or tied to a channel node ID for disambiguation.

The STPR estimate calculation uses $P_{ratio,exc}$ and $M_{ratio,exc}$ determined in functional block 808. The STPR estimate calculation is defined by the following mathematical equations (1) and/or (2).

$$STPR_{estimate} = ((P_{ratio,exc}/M_{ratio,exc}) \cdot \gamma)/(\gamma + (R_c/R_b)) \quad (1)$$

where y is the SNR (e.g., Eb/N0) measured in block 808 after the interference cancellation or excision circuit, $R_c$ is a chipping rate for receive channel (i.e., rate at which a transmitted signal is spread), and $R_b$ is an information bit rate corresponding to γ. Note that: $STPR_{estimate}$ is computed such that the signal power is available after multiplying by the total power calculated by summing spectral bins; $R_c$ can be different for a communication channel and a control channel.

$$STPR_{estimate\text{-}logdomain} = 10*\log_{10} STPR_{estimate} \quad (2)$$

$STPR_{estimate\text{-}logdomain}$ represents the STPR estimate value in a log domain.

To derive the STPR estimate, the following relationship is considered.

$$STPR = P_{sig}/P_{total} \quad (3)$$

where $P_{sig}$ represents a received signal power and $P_{total}$ represents a total power in a received FFT spectrum within bins occupying a SOI. Given the fact that a residual power after excision is equal to the signal power, scaled by the excision percentage, plus the noise-plus-interference power, scaled by the excision percentage, the following mathematical expression (4) is derived.

$$P_{total} \cdot P_{ratio,exc} = P_{sig} \cdot M_{ratio,exc} + (N_0 + I_0) R_c \cdot M_{ratio,exc} \quad (4)$$

where $P_{ratio,exc}$ represents a ratio of total power post-excision to total power pre-excision (note that the pre- and post-excision powers may be obtained from excision metadata output from the excision circuit), $N_0$ represents a noise power spectral density (i.e., the receiver noise power divided by the spread bandwidth), $I_0$ represents the interference power spectral density (i.e., the received power from interference signals divided by the spread bandwidth), $(N_0+I_0)R_c$ represents the noise-plus-interference power in a receiver central bandwidth. The following mathematical expression (5) is also used for a measured post-excision effective Eb/N0.

$$\rho = P_{sig}/(((N_0+I_0)R_b) \quad (5)$$

where ρ represents the measured post-excision effective Eb/N0 (i.e., the energy per bit divided by the noise-plus-interference density). Solving for the noise-plus-interference spectral density, mathematical equation (6) is obtained.

$$(N_0+I_0) = P_{sig}/(\rho \cdot R_b) \quad (6)$$

Mathematical equation (6) can be substituted into the prior expression and solved for $P_{sig}$ as shown by mathematical equation (7)-(10).

$$P_{total} \cdot P_{ratio,exc} = P_{sig} \cdot M_{ratio,exc} + (P_{sig}/\rho \cdot R_b) R_c \cdot M_{ratio,exc} \quad (7)$$

$$(P_{total} \cdot P_{ratio,exc})/M_{ratio,exc} = P_{sig}(1+(R_c/\rho \cdot R_b)) \quad (8)$$

$$P_{sig} = (P_{total} \cdot P_{ratio,exc})/(M_{ratio,exc} \cdot (1+(R_c/\rho \cdot R_b))) \quad (9)$$

This result can be substituted into the definition of STPR to get the following mathematical expression (10).

$$STPR = P_{ratio,exc}/(M_{ratio,exc} \cdot (1+(R_c/\rho \cdot R_b))) \quad (10)$$

or equivalently, the above provided mathematical equation (1). The STPR represents the power of a received signal as a ratio of the total received power in the same frequency space. In other words, it represents the power of a signal of interest as a percentage of the total power. However, as opposed to representing the power as a percentage, it is represented in dB. This becomes a very useful metric for highly spread signals that can't be seen above the noise floor of the received spectrum.

Figure 10:
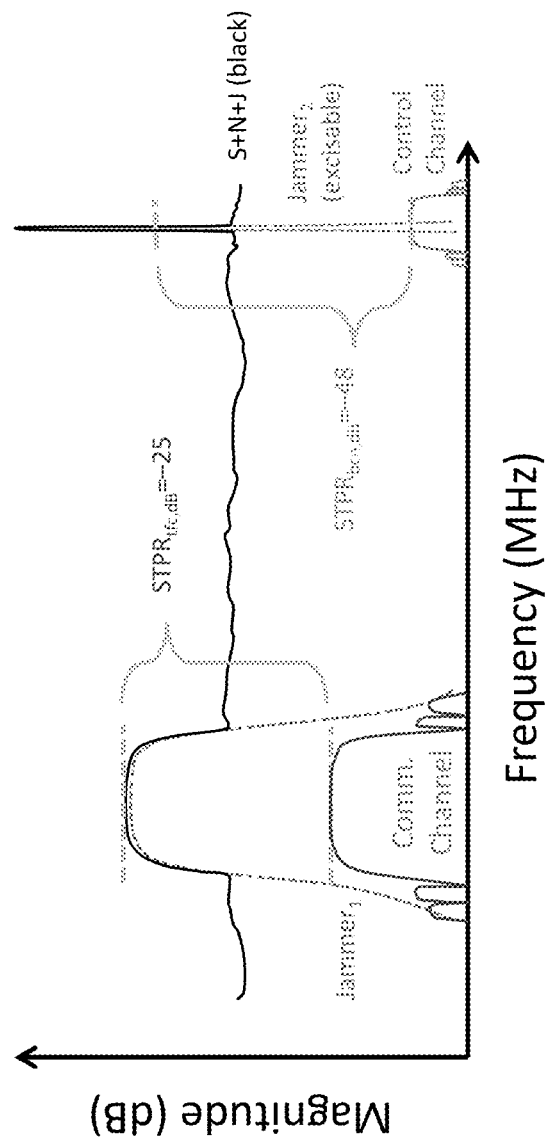
FIG. 10 provides a graph showing a visualization of the STPR in a power spectral density setting.

FIG. 10 shows a visualization of STPR in a power spectral density setting. In FIG. 10, the STPR for a received communication channel is shown with the channel being jammed while operating in the same frequency as a wideband jammer. This wideband jammer is not excised from the communication channel. As a second example in FIG. 10, the STPR of an example control signal is shown as the difference in average power over the bandwidth of the control channel. In this example, the control channel is not severely affected by a narrowband interference signal Jammer$_2$ since it is excised completely. The STPR for the control channel includes the excision performance as part of its calculation.

As noted above in relation to FIG. 4, the metrics determined by the second computing device (e.g., network node 108 of FIGS. 1-2) are aggregated and used to generate a STEP message. Besides the temporal interference signal data and the $STPR_{estimate}$ values, the STEP message may also contain a formatted version of the spectral data. For example, the spectral data is averaged over a STEP interval. The power for each bin is scaled according to the AGC gain setting(s). Only the valid bins are sent to the first communication device for each band. The start frequency of the band is the lowest frequency of the first valid bin. Likewise, the stop frequency is the highest frequency of the last valid bin for that band. Each bin is represented by up to some number of bits for a relative power estimate with a particular digital resolution. The spectral power values in the bins are scaled such that the spectrum is normalized to the lowest power bin. The lowest power bin is assumed to be at the noise floor. Consequently, the difference between the lowest power bin and the assumed noise floor (represented as a Noise Figure in dB) is reflected in the Noise Figure Offset (NFO) field. Although it is not expected, any power that has higher relative power than the bin quantization range is clipped. The following steps summarize the spectral data formatting for each band: scaling an averaged linear power in FFT bins based on the AGC gain setting(s); converting the averaged spectral power of the valid bins to dB; identifying a lowest power bin; saving a difference between the lowest power bin and the power due to the default noise figure as the NFO; subtracting the averaged spectral power by the power of the lowest power bin to produce the relative spectral power; clipping a relative spectral power, if necessary, at the maximum value depending on the desired bin resolution; and/or quantizing a relative spectral power to a desired resolution.

FIG. 11 provides a table showing an illustrative format for the STEP message. The size of the STEP message may be reduced in some scenarios. For example, the number of bins in the STEP message can be reduced.

Figure 12:
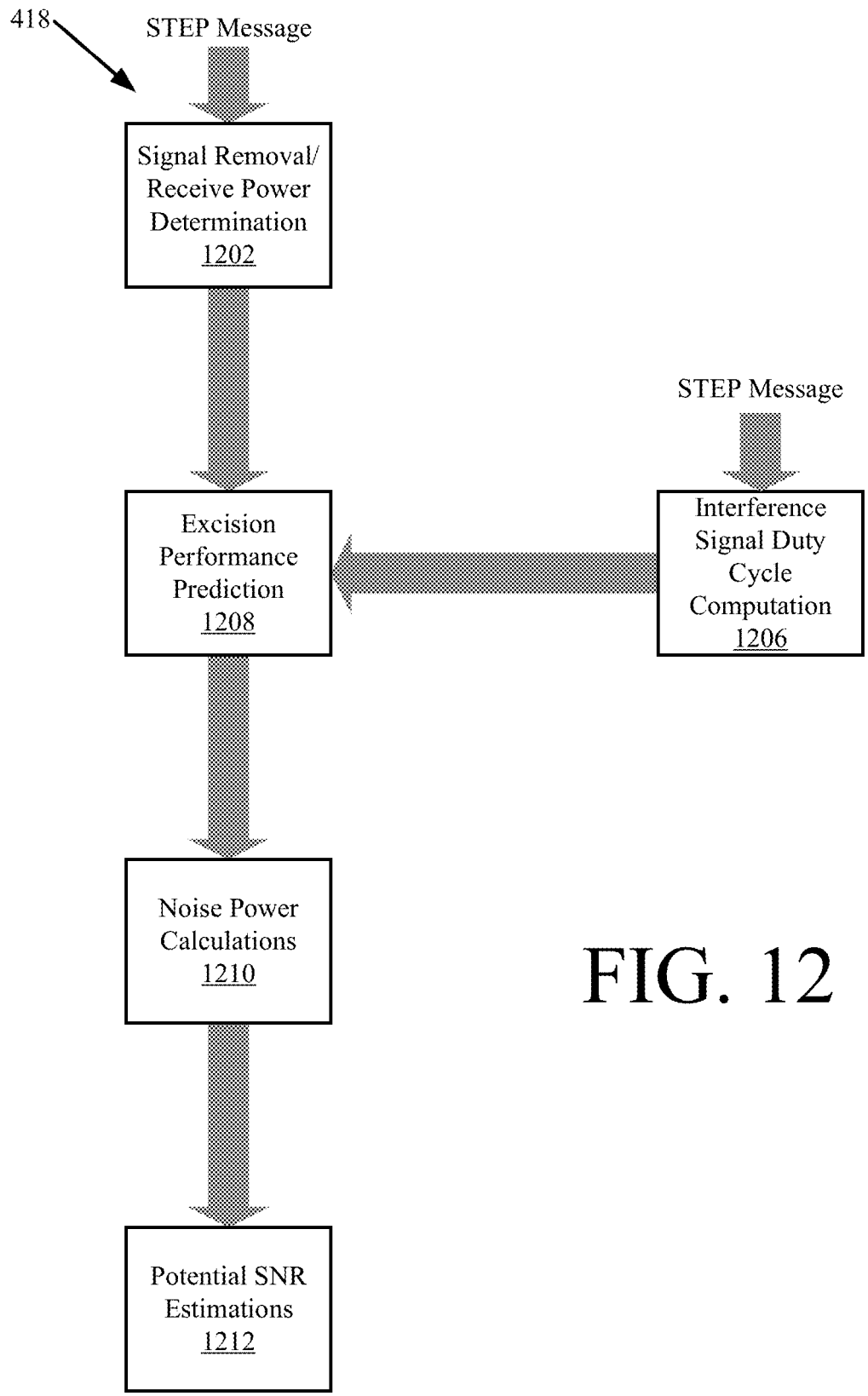
FIG. 12 provides an illustration that is useful for understanding how a predicted SNR condition for a frequency band is determined by a network node.

Referring to FIG. 12, there is provided an illustration that is useful for understanding the operations of block 418 in FIG. 4. At the first communication device (e.g., network node 106 of FIGS. 1-2), the STEP and PAR messages are received and processed to determine a predicted SNR condition for every frequency bin in each receive band of the network. The four main operations of this process are: (i) removing a known signal power (e.g., a traffic channel SOI) from the spectral power estimates; (ii) estimating an excision performance (when excision estimation is enabled); (iii) calculating the noise power for both excision and non-excision cases; and (iv) calculating the predicted SNR (Eb/NO) condition for every frequency bin in each frequency band. The calculation of a predicted SNR (Eb/N0) condition can be performed based on the STEP message received on a given channel (e.g., traffic or beacon channel).

Each predicted SNR (Eb/N0) condition is determined via operations of functional blocks 1202-1212. Note that the STEP message includes spectral and temporal information for interference signal(s) to allow network nodes to make decisions in a decentralized fashion. The position data of the STEP message facilitates the creation of a 3D spectral map of a given space.

In functional block 1202, each STPR$_{estimate}$ is used in functional block 1202 to remove a local signal power from a total spectral power measured at the second communication device to obtain a receive signal power P$_{sig}$ for the given channel. For example, with reference to FIG. 9, P$_{sig}$ is determined by (i) computing the total local signal power in the channel frequency spectrum by summing the power values of a signal 902 of FIG. 9(*a*) which reside within frequency range 910 of a given channel and (ii) multiplying the sum by the STPR$_{estimate}$ for the given channel. P$_{sig}$ is defined by the following mathematical equation (11).

$$P_{sig} = P_T \cdot STPR_{estimate} \quad (11)$$

where P$_T$ represents a total local signal power in a channel frequency spectrum. After the signal power is calculated, it is removed from the receive spectrum so that the SNR estimate can be computed correctly in the portion of the band where the signal was received by the second communication device (e.g., network node 108 of FIGS. 1-2). An illustrative example of removing the receive signal power from these operations of functional block 1202 is provide in FIG. 13(*c*). The receive signal power P$_{sig}$ is then passed to functional block 1208.

P$_T$ for each transmitted signal (e.g., traffic signal(s) and/or beacon signal(s)) can be computed from the relevant spectral power values from the FFT operations performed at the second communication device. Each FFT bin represents an estimate of an average total power seen by the second communication device over the frequencies contained in the FFT bin (e.g., about 5 MHz). The contributions of the total power can be from various sources. These sources can include noise, signals transmitted from other communication devices at these frequencies, and interference signals. In addition, and importantly, the communication channel from the first communication device (e.g., network node 106 of FIGS. 1-2) will be part of the power within certain bins. For example, assume there are N spectral power values in the FFT, and the communication channel (e.g., traffic channel) sent by the first communication device (e.g., network node 106 of FIGS. 1-2) occupies bins N$_i$ through N$_j$(N$_j$–N$_i$+1 bins) of all the N bins. Therefore, the total power P$_T$ seen in bins N$_i$ through N$_j$ equals the sum of all of the energy picked up by the second communication device in those bins. The power P$_{sig}$ of the communication signal received by the second communication device is some portion of P$_T$, and the STPR$_{estimate}$ is a representation of that portion. The STPR$_{estimate}$ can be thought of as a percentage, though it is represented in dB. It is desirable to work with actual power values with overall processing, not just percentage's, so in order to calculate the actual received power of the transmitted signal seen at the second communication device, the system multiplies the STPR$_{estimate}$ value by P$_T$, where P$_T$ is the sum of the N$_j$–N$_i$+1 bins of interest. The result of this calculation is P$_{sig}$ as shown by the above mathematical equation (11). Thus, P$_T$ can be defined as $$\sum_{i_{start}}^{i_{stop}} FFT_i,$$

and mathematical equation (11) can be rewritten as mathematical equation (12).

$$P_{sig} = STPR_{estimate} \sum_{i_{start}}^{i_{stop}} FFT_i \quad (12)$$

In some scenarios, the STEP message is processed in functional block 1202 to extract or otherwise remove a known signal power from the relevant FFT bins contained in a given channel. The result of this operation is a new array which contains the FFT spectral data without the local node's signal. In the case of multiple communication channels or multiple control channels, the frequency selection logic prevents overlap, so all of the desired types of channels from a given node can be removed from the spectrum in preparation for the predicted SNR (Eb/N0) condition determination of functional block 1212. If the current band being processed is not the same band as the first network node's transmit band, no signal removal operation is necessary.

Since the signal removal involves subtraction, all of the following calculations are performed in the linear domain. The calculation begins by setting the output equal to the input for each index as shown by the following mathematical equation (13).

$$FFT_{mod, i} = FFT_i \quad (13)$$

where FFT$_{mod, i}$ represents the i$^{th}$ bin of the modified FFT spectrum that has the signal component(s) removed (linear), and FFT$_i$ represents the i$^{th}$ bin of the received FFT spectrum (relative power) after converting to linear. The following steps are repeated for each channel. The next step is to determine the start and stop indices for the channel of interest. Note that the first valid bin is index 0. The stop index is lower bounded by 0. The stop index is upper bounded by N$_{valid}$–1.

$$i_{start} = |(f_{sig} - (R_c/2) - f_{start})/\Delta f_{bin})| \quad (14)$$

$$i_{stop} = |(f_{sig} + (R_c/2) - f_{start})/\Delta f_{bin})| \quad (15)$$

$$\Delta f_{bin} = (f_{stop} - f_{start})/N_{valid} \quad (16)$$

where i$_{start}$ represents a start index, i$_{stop}$ represents a stop index, f$_{sig}$ represents a center frequency of a communication signal (e.g., a traffic signal) or a control signal (e.g., a beacon signal), f$_{start}$ represents a lower frequency boundary of a first valid frequency bin (Hz), f$_{stop}$ represents an upper frequency boundary of a last valid frequency bin (Hz), and N$_{valid}$ represents a number of valid bins in a band. The number of bins affected by the channel is defined by the following mathematical equation (17).

$$N_{Ch} = i_{start} - i_{stop} + 1 \quad (17)$$

where N$_{Ch}$ represents a number of bins affected by the channel of interest.

At this point, the system performs operations to subtract the signal power per frequency bin from the affected bins. These operations are defined by the following mathematical equation (18).

$$FFT_{mod,i} = \begin{cases} FFT_{mod,i} & \text{for each } i < i_{start} \text{ or } i > i_{stop} \\ FFT_{mod,i} - (P_{sig}/N_{Ch}) & \text{for each } i_{start} \leq i \leq i_{stop} \end{cases} \quad (18)$$

After all of the signals have been accounted for, the $FFT_{mod,i}$ array contains the desired spectrum.

Figure 14:
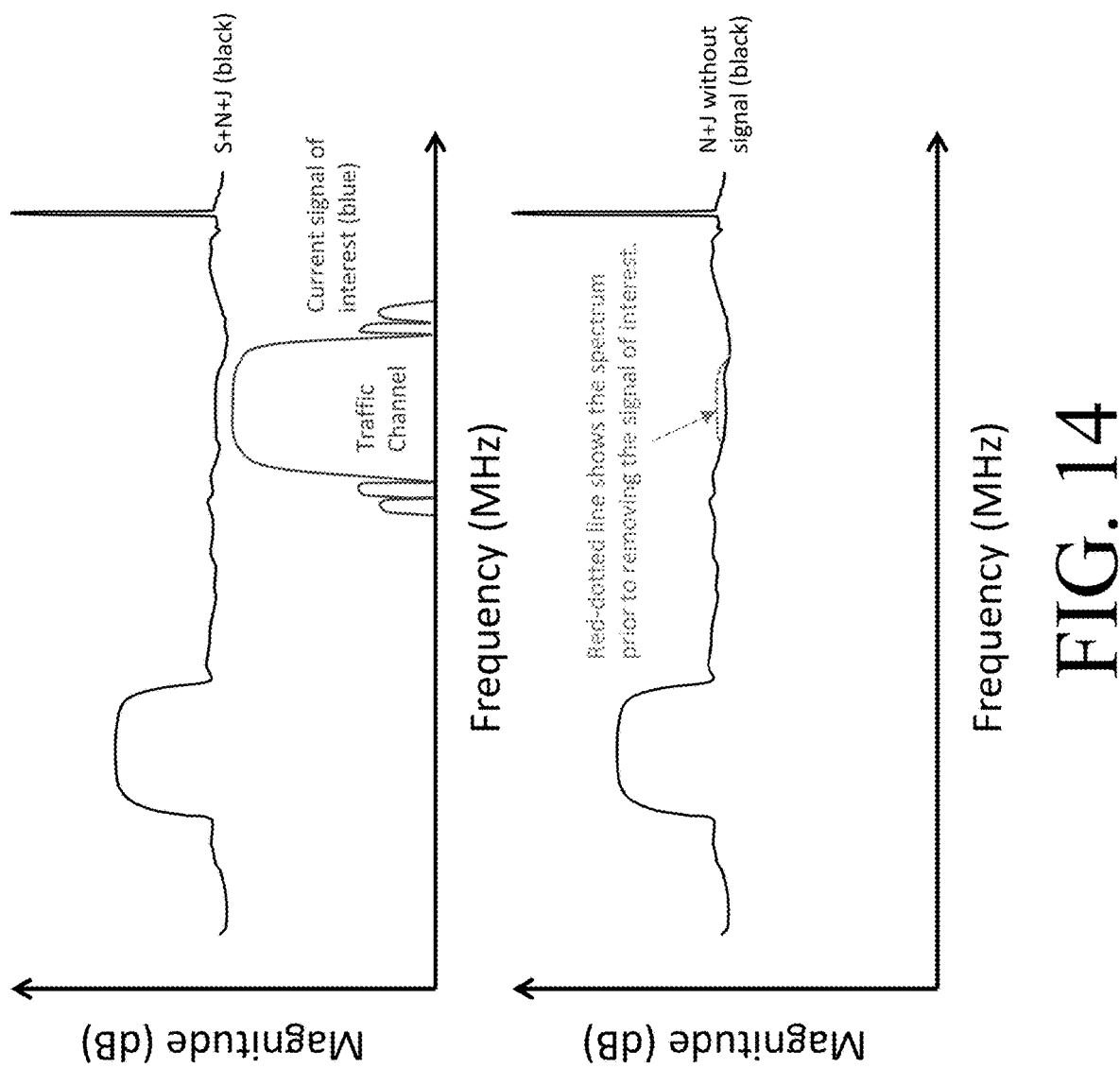
FIG. 14 provides graphs showing a resulting spectrum after a communication signal (e.g., a traffic signal) is removed from a signal.

FIG. 14 shows another example of the resulting spectrum after a communication signal (e.g., a traffic channel signal) is removed. In this case, there is little impact to the spectrum because the communication signal is below the noise floor. However, in cases where the signal is above the noise floor, subtracting the signal could change the spectrum by several dB. Furthermore, this operation is crucial to predicting Eb/N0 correctly across the entire spectrum for the signal of interest.

In functional block 1206, the STEP message is processed to extract the interference signal IDs. As noted above, each interference signal ID comprises a frequency location, a PW, and a PRI for a given interference signal. The PW and PRI for each interference signal is used to compute a duty cycle per interference signal. The duty cycle information is subsequently used to account for peak interference signal power. Each duty cycle is the fraction of one period in which a signal is active. A period is the time it takes for the signal to complete an on-and-off cycle. The duty cycle can be defined by the following mathematical equation (19).

$$D_j = PW_j / PRI_j \quad (19)$$

where $D_j$ is the duty cycle, $PW_j$ is the pulse width time, and $PRI_j$ is the pulse repetition interval for interference signal j. The D(s), PW(s), and/or PRI(s) is(are) passed to functional block 1208.

At functional block 1208, operations are performed using the information received from blocks 1202 and 1206 to (i) scale the receive signal power $P_{receive}$ by the inverse of the duty cycle(s) $D_j$ and/or (ii) predict whether an interference cancellation circuit of a receiving communication device can excise a given interference signal and remove the same from a received signal if the frequency of the interference signal were to overlap the frequency of the received signal.

Figure 13:
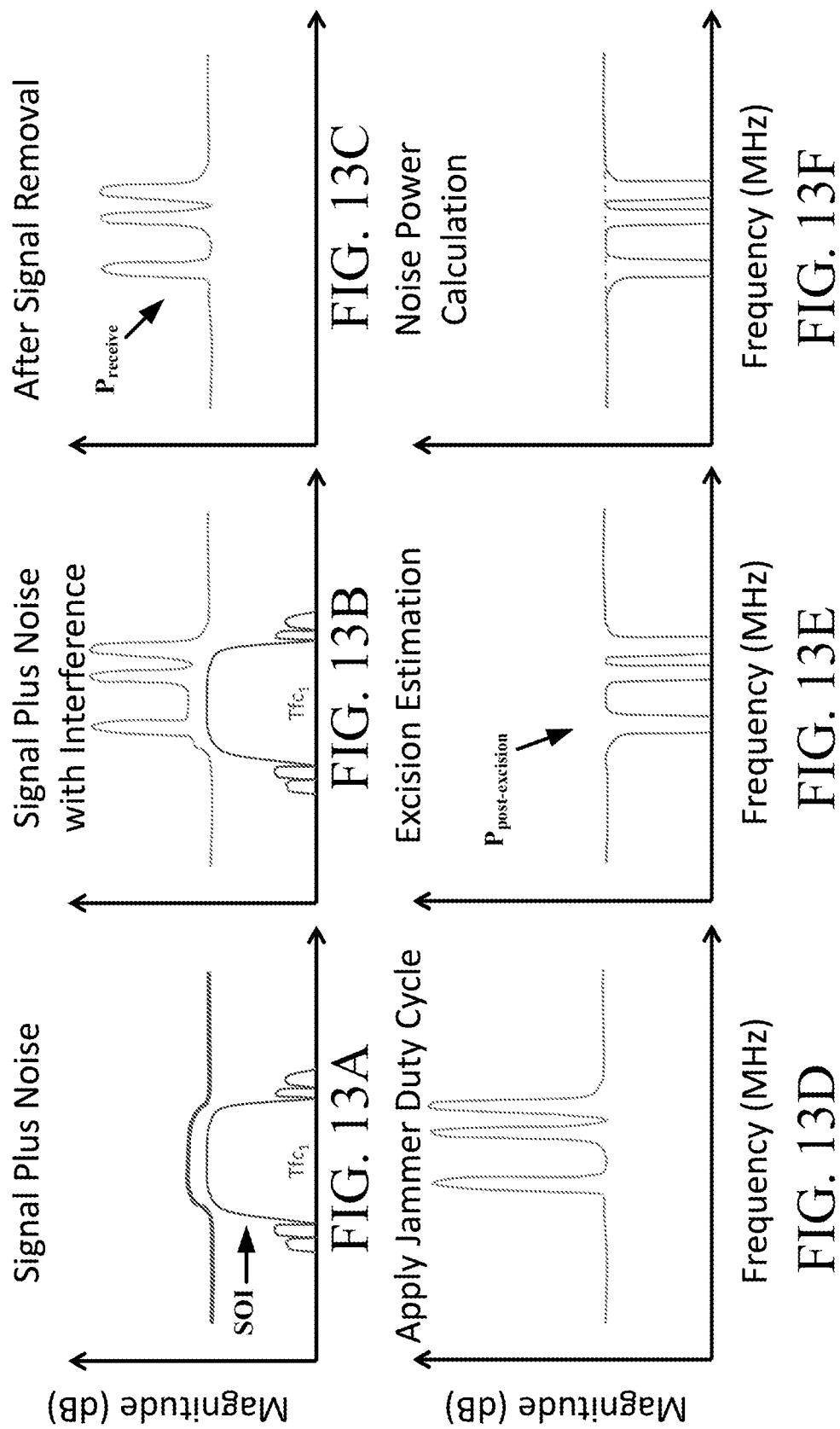
FIGS. 13(a)-13(f) (collectively referred to herein as "FIG. 13") provide graphs that are useful for understanding how a predicted SNR condition for a frequency is determined.

For example, with reference to FIG. 6, the first communication device (e.g., network node 106 of FIGS. 1-2) makes a prediction that interference signal $I_2$ would be able to be excised or removed from a received signal if the channel $CH_N$ was in the same frequency location of the frequency band $Band_x$ as the interference signal $I_2$. Next, characteristics of the interference signal $I_2$ are used to generate a predicted post-excision signal. The predicted post-excision signal defines an excision circuit performance prediction. The excision circuit performance prediction is made using the scaled received signal power and information contained in the interference signal IDs extracted from the STEP message. An illustrative scaled receive signal power is shown in FIG. 13(*d*). An illustrative predicted post-excision signal is shown in FIG. 13(*e*).

The predicted post-excision signal is generated by modifying the spectral data to account for interference signal duty cycle $D_j$ that are less than unity (i.e., $PW_j < PRI_j$). The modified spectrum is used to determine an excision threshold value. First, the system initializes a vector of duty cycle values β to zero for each FFT bin. $i_{start}$ is then computed for each interference signal of index j in accordance with mathematical equations (20)-(21).

$$i_{start} = |(f_{interference,j} - (\Delta f_{interference,j}/2) - f_{start})/\Delta f_{bin}| \quad (20)$$

$$i_{stop} = |(f_{interference,j} + (\Delta f_{interference,j}/2) - f_{start})/\Delta f_{bin}| \quad (21)$$

For each index $i_{start} \leq i \leq i_{stop}$,
$\beta_i = \beta_i + (PW_j/PRI_j)$, if $PW_j \geq PW_{thresh}$ or
$\beta_i = \beta_i + (PW_{thresh}/PRI_j)$, if $PW_j < PW_{thresh}$.

Note that in the second case, the PW is too short to be resolved by the receiver's excision circuit, so the effect is that it is distributed over the pulse width threshold, which is set to be the duration of the FFT in the excision circuit.

After accounting for all of the interference signals, the following threshold is applied to the accumulated duty cycle values.

$\beta_i$1, if $\beta_i \geq 1$ $\beta_i = 0$

As a result of this threshold, bins with more than one interference signal and accumulated duty cycle values greater than or equal to unity will be treated as a continuous signal rather than pulsed. Likewise, bins without any influence from an interference signal will be treated as a continuous signal.

The final set of operations approximate the interference signal spectrum. First, the interference signal spectrum is initialized to the modified FFT spectrum with the signal component(s) removed for all i.

$FFT_{interference,i} = FFT_{mod,i}$

Then for each index i, $FFT_{interference,i} = (1/\beta_i) FFT_{interference,i}$ With this scaling value, $FFT_{interference}$ now represents the spectrum of the peak interference signal power, which will be used to determine the bins to excise or otherwise remove from the FFT.

In functional block 1208, the excision performance is estimated across a communication or control channel bandwidth at every valid FFT bin center frequency. This is performed using the spectral bins $FFT_{interference,i}$ that have been adjusted for the interference signal duty cycle. In order to estimate a decision threshold, the mean power of the non-excised bins $Exc_{mean}$ must be determined. This is obtained by averaging the minimum number of non-excised bins in a signal bandwidth $N_{min}$ with the lowest power in the signal bandwidth. This can be obtained by sorting the values in ascending order and averaging the first $N_{min}$ bins in the linear domain. Another parameter of interest is $P_{Nmin}$ which is the power of the $N_{min}^{th}$ bin when they are in ascending order. The value of $N_{min}$ depends upon the minimum ratio $\Gamma_{min}$ of non-excised bins to the total number of bins in the signal bandwidth (which is a database value set to match the performance of the receiver's excision circuit). Since the minimum ratio $\Gamma_{min}$ does not change, $N_{min}$ need only be calculated once for each spread bandwidth in accordance with the following mathematical equation (22).

$$N_{min} = |\Gamma_{min}(i_{stop} - i_{start} + 1)| \quad (22)$$

where the start and stop indices are calculated based on a center frequency of a bin. To compute the excision threshold, the mean power of the non-excised bins $Exc_{mean}$ is scaled by $\alpha_e$ and compared with $P_{Nmin}$ in accordance with the following mathematical equation (23).

$$Exc_{thresh} = \max(\alpha_e \cdot EXC_{mean}, P_{Nmin}) \quad (23)$$

Figure 15:
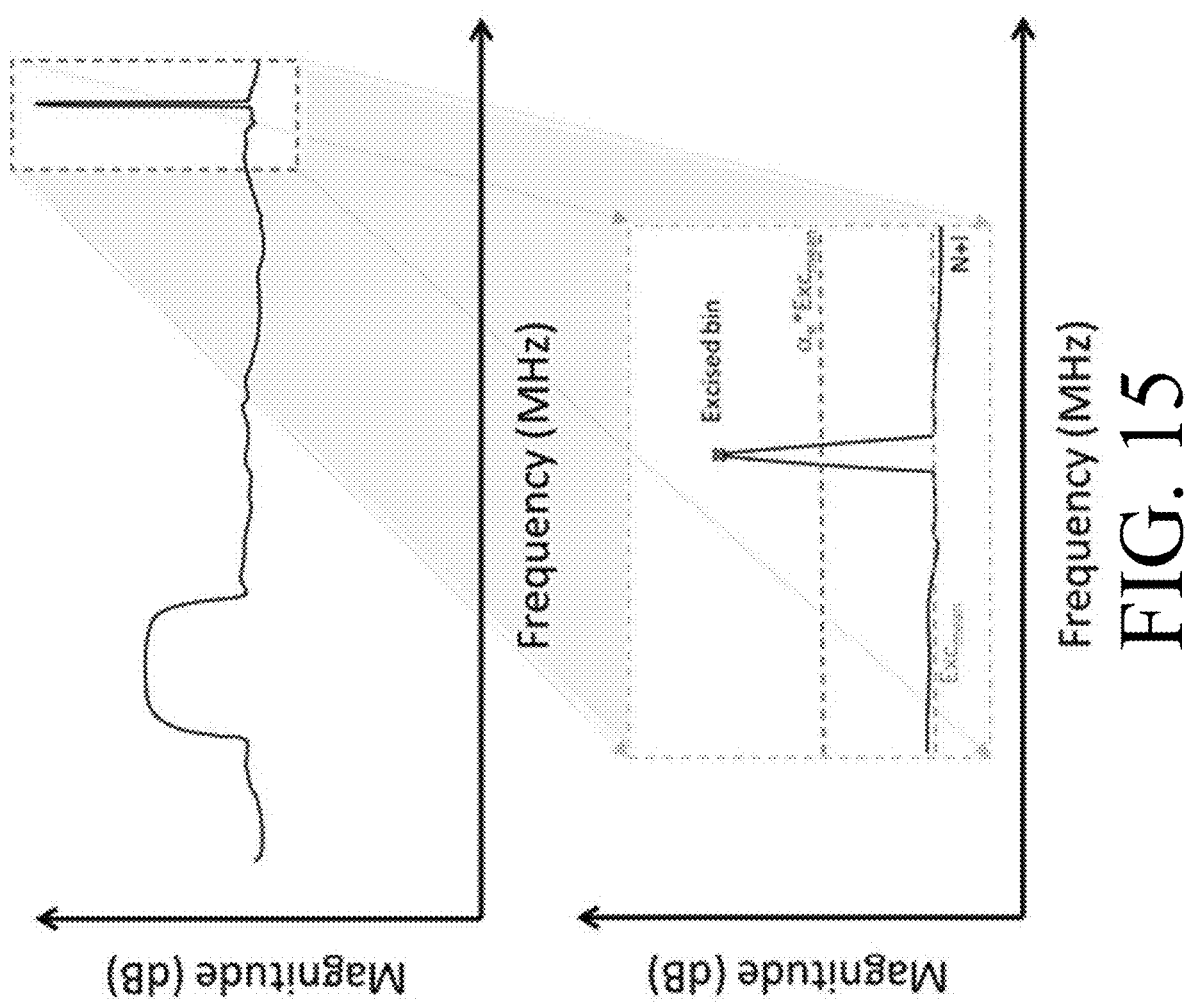
FIG. 15 provides graphs showing a visual representation of excision threshold computations.
Figure 16:
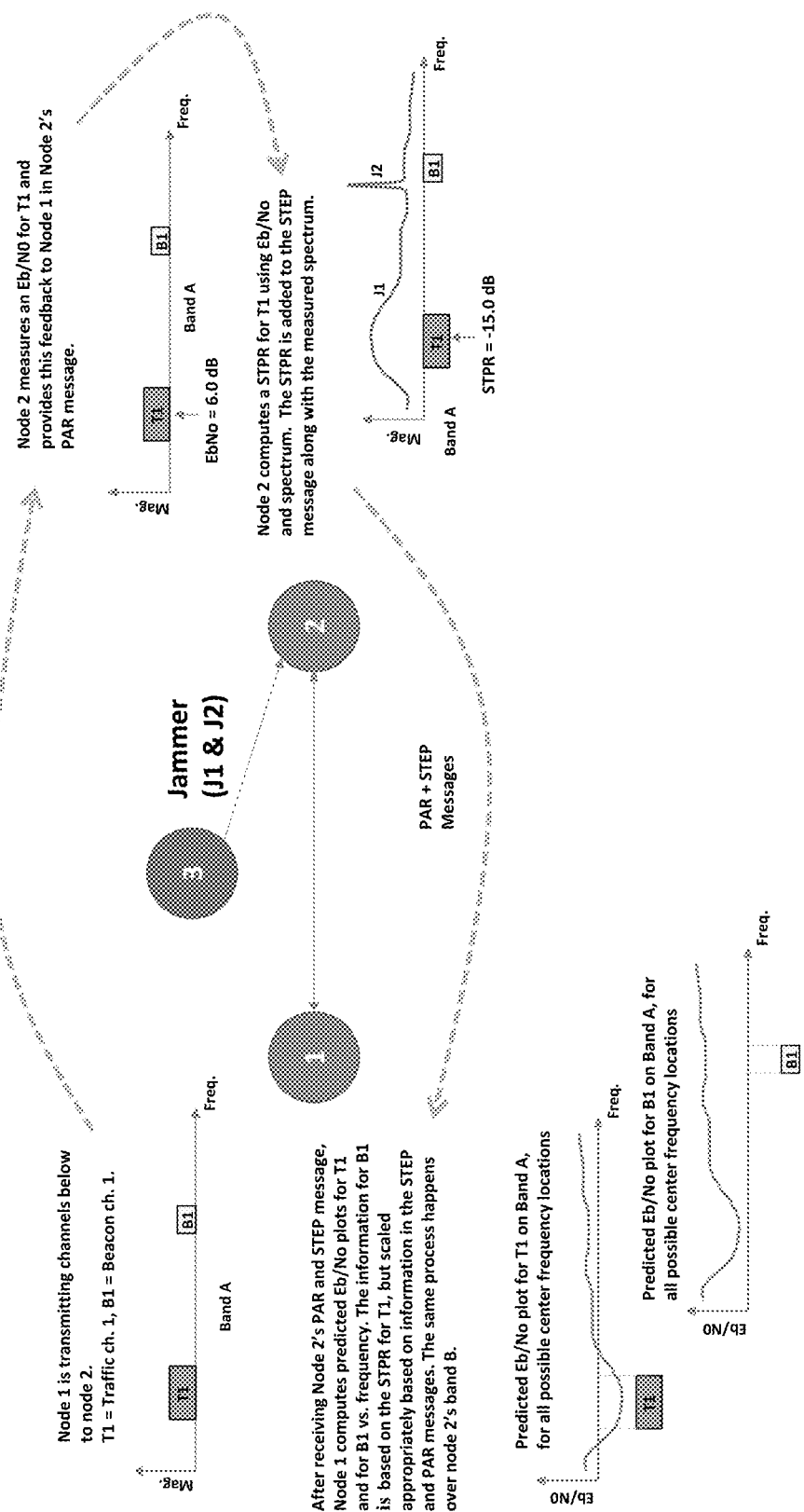
FIG. 16 provides an illustration that is useful for understanding the present solution.

The scale factor $\alpha_e$ is in a database or other memory, and is set to approximate the threshold setting used by the receiver's excision circuit. Taking the maximum will enforce the rule that prohibits the excision circuit from excising more than $\Gamma_{min}$ of the total signal bandwidth. FIG. 15 provides graphs showing a visual representation of the above excision threshold computations.

In functional block 1210, a noise power $P_{noise}$ for the bins of interest is computed. The noise power $P_{noise}$ is the remaining power occupying the same bandwidth (e.g., $N_{ch}$ bins) as the signal sent by the first communication device. Thus, the noise power $P_{noise}$ can be computed by, for example, summing up the powers of continuous FFT bins occupied by the signal sent by the first communication device (e.g., $N_{ch}$ bins) of the N bins according to the above example).

In functional block 1212, a predicted SNR (Eb/N0) estimate is determined from the relative spectrum with the signal component(s) removed. The presented SNR (Eb/N0) estimate can be determined with or without the excision estimation included. In either case the denominator will be the summation of the noise spectral density ($N_0$) and the interference spectral density ($I_0$). The calculations are performed at a bin center frequency of $f_{new}$. The following mathematical equations (24)-(25) show the calculation for the start index as well as the stop index for a given frequency $f_{new}$.

$$i_{start}=|(f_{new}-(R_c/2)-f_{start})/\Delta f_{bin} \quad (24)$$

$$i_{stop}=|(f_{new}+(R_c/2)-f_{start})/\Delta f_{bin} \quad (25)$$

Since the center frequency is the center of a bin, the start and stop indices are a fixed offset from the center bin. Consequently, the start and stop indices do not need to be calculated for each bin. Note that the predicted SNR (Eb/N0) calculations are only performed for bins that allow the spread bandwidth $R_c$ to fit between the start frequency $f_{start}$ and the stop frequency $f_{stop}$ (i.e., $f_{new}-(R_c/2) \geq f_{start}$ and $f_{new}+(R_c/2) \leq f_{stop}$.

When there is no excision estimation required the mathematical equations below show how the predicted SNR (Eb/N0) estimate is calculated for a bin center frequency of $f_{new}$. The signal power is adjusted according to frequency to represent expected received signal power at the bin center frequency $f_{new}$. The noise-plus-interference spectral density is estimated by summing the power of all of the FFT bins with the signal component(s) removed, and then dividing by the bandwidth of the bins.

$$\rho_{pred} = \frac{\frac{P_{sig}}{(f_{new}/f_{sig})^2 R_b}}{1/((i_{stop}-i_{start}+1)\Delta f_{bin}) \sum_{i=i_{start}}^{i_{stop}} FFT_{mod,i}} \quad (26)$$

$$\rho_{pred} = \frac{P_{sig}(i_{stop}-i_{start}+1)\Delta f_{bin}}{(f_{new}/f_{sig})^2 R_b \sum_{i=i_{start}}^{i_{stop}} FFT_{mod,i}} \quad (27)$$

where $\rho_{pred}$ represents a predicted SNR (Eb/N0) estimation.

The mathematical equations (26)-(27) calculate the predicted SNR (Eb/N0) estimate for the power and rate settings as reported in the PAR message associated with the STEP message. If the predicted SNR (Eb/N0) estimate is desired at a different power and rate combination, then it can be scaled in accordance with the following mathematical equation (28).

$$\rho_{new}=\rho_{curr}(P_{new}/P_{curr})(R_{b,curr}/R_{b,new}) \quad (28)$$

where $R_{b,curr}$ is the same as $R_b$ that was used above.

When determining a predicted SNR (Eb/N0) estimate including excision, the system first determines which bins are to be excised. After determining the excised bins, the remaining calculation is similar to the case without excision estimation.

Once the excision threshold is determined as described above in relation to functional block 1208, all of the values necessary to compute the predicted SNR (Eb/N0) estimate have been obtained. The spectral bins with the signal removed are summed to estimate the noise-plus-interference floor if the value is below the calculated threshold. As those bins are summed, the count of non-excised bins $N_{bins}$ is incremented so that it equals the number of non-excised bins. All of the other aspects of the following mathematical equations (29)-(30) match the calculation without excision.

$$\rho_{pred} = \frac{(P_{sig}/(f_{new}/f_{sig})^2 R_b) \cdot ((N_{bins}-N_{bins,exc})/N_{bins})}{(1/(N_{bins} \cdot \Delta f_{bins})) \sum_{i=i_{start}, FFT_{mod,i}<Excthresh}^{i_{stop}} FFT_{mod,i}} \quad (29)$$

$$\rho_{pred} = \frac{P_{sig} \cdot (N_{bins}-N_{bins,exc}) \cdot \Delta f_{bins}}{(f_{new}/f_{sig})^2 R_b \sum_{i=i_{start}, FFT_{mod,i}<Excthresh}^{i_{stop}} FFT_{mod,i}} \quad (30)$$

Figure 17:
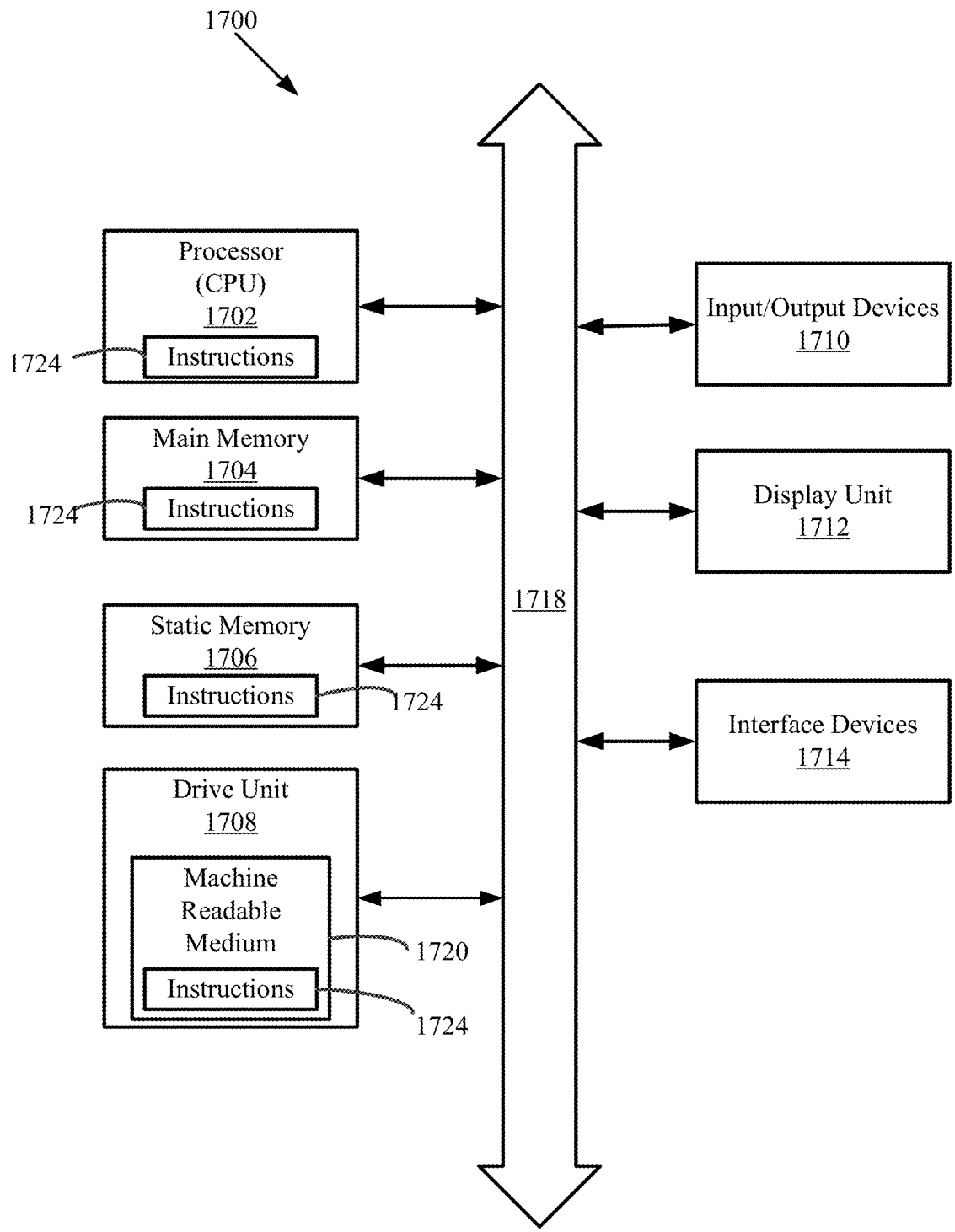
FIG. 17 provides an illustration of an illustrative computing device.

Referring now to FIG. 17, there is shown a hardware block diagram comprising an example computer system 1700 that can be used for implementing all or part of network nodes 102-108 of FIG. 1 and/or communication device 300 of FIG. 3. The machine can include a set of instructions which are used to cause the circuit/computer system to perform any one or more of the methodologies discussed herein. While only a single machine is illustrated in FIG. 12, it should be understood that in other scenarios the system can be taken to involve any collection of machines that individually or jointly execute one or more sets of instructions as described herein.

The computer system 1700 is comprised of a processor 1702 (e.g., a Central Processing Unit (CPU)), a main memory 1704, a static memory 1706, a drive unit 1708 for mass data storage and comprised of machine readable media 1720, input/output devices 1710, a display unit 1712 (e.g., a Liquid Crystal Display (LCD)) or a solid state display, and one or more interface devices 1714. Communications among these various components can be facilitated by means of a data bus 1718. One or more sets of instructions 1724 can be stored completely or partially in one or more of the main memory 1704, static memory 1706, and drive unit 1708. The instructions can also reside within the processor 1702 during execution thereof by the computer system. The input/output devices 1710 can include a keyboard, a multi-touch surface (e.g., a touchscreen) and so on. The interface device(s) 1714 can be comprised of hardware components and software or firmware to facilitate an interface to external circuitry. For example, in some scenarios, the interface devices 1714 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry, and generate the necessary control signals for certain operations described herein.

The drive unit 1708 can comprise a machine readable medium 1720 on which is stored one or more sets of instructions 1724 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure.

Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 1700 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for evaluating link performance over a multitude of frequencies for Signal-to-Noise Ratio (SNR) optimization and mitigating interference, comprising:
communicating, from a first communication device, a first signal over a given channel in a given frequency band;
receiving, by the first communication device, (i) a Signal-to-Total Power Ratio (STPR) estimate determined based on a second signal including the first signal combined with at least one of noise and one or more interference signals, the STPR estimate accounts for at least one of (a) receiver performance including chip rate processing gain and (b) performance of an interference cancellation circuit used to remove the interference signals from the second signal, and (ii) spectral measurements based on the second signal; and
determining, by the first communication device, a predicted energy-per-bit to noise-power-spectral-density ratio (Eb/N0) condition for a plurality of frequencies within the given frequency band using the STPR estimate and the spectral measurements.

2. The method according to claim 1, wherein the second signal comprises a total power including the first signal, the potentially one or more interference signals, and the noise.

3. The method according to claim 1, further comprising selecting, by the first communication device, a channel from a plurality of channels over which signals should be sent based on the predicted Eb/NO condition.

4. The method according to claim 3, further comprising performing operations by the first communication device to communicate information over the selected channel.

5. The method according to claim 1, wherein the STPR estimate is a function of (i) a ratio $P_{ratio,exc}$ of an output signal power and an input signal power of an interference cancellation circuit and (ii) a mask ratio $M_{ratio,exc}$ representing a percentage of the first signal remaining from the second signal by the interference cancellation circuit.

6. The method according to claim 1, where the STPR estimate is set equal to $((P_{ratio,exc}/M_{ratio,exc})\cdot\gamma)/(\gamma+(R_c/R_b))$, where $\gamma$ is an Eb/N0 of the second signal after the interference cancellation circuit, $R_c$ is a chipping rate for the given channel, and $R_b$ is an information bit rate corresponding to $\gamma$.

7. The method according to claim 1, wherein the predicted Eb/No calculation includes removing a known power spectrum of the first signal from a relevant total spectral power measured at a receiver.

8. The method according to claim 7, wherein the known power of the first signal is obtained by multiplying the STPR estimate by a sum of a total spectrum over given Discrete Fourier Transform (DFT) bins.

9. The method according to claim 7, wherein the total spectral power is specified by summing the relevant spectral power estimates measured across the given frequency band as the second signal is being received.

10. The method according to claim 9, wherein the spectral power estimates comprise a Discrete Fourier Transform (DFT).

11. The method according to claim 9, wherein at least some of the spectral power estimates comprise information for the interference signals.

12. The method according to claim 9, wherein the spectral power estimates are scaled by the inverse of the duty cycles of the interference signals.

13. The method according to claim 12, wherein the scaled spectral power estimates are used to predict whether the interference cancellation circuit can excise a given interference signal of the interference signals from the second signal.

14. The method according to claim 13, wherein a power of the given interference signal is removed from the scaled spectral power estimates when a prediction is made that the interference cancellation circuit can excise the given interference signal from the second signal.

15. The method according to claim 1, wherein the predicted Eb/N0 condition is determined by:
estimating Eb by summing a pre-excision power spectrum centered at a given frequency and scaling the summation by a signal-to-total power ratio, which includes excision performance, to generate a value, and dividing the generated value by a bit rate; and estimating N0 by summing a post-excision power spectrum over relevant bins to obtain a sum value, and dividing the sum value by a chip rate.

16. A communication device, comprising:
a transceiver configured to communicate a first signal over a given channel in a given frequency band, and receive (i) a Signal-to-Total Power Ratio (STPR) estimate determined based on a second signal including the first signal combined with at least one of noise and one or more interference signals, the STPR estimate accounts for at least one of (a) receiver performance including chip rate processing gain and (b) performance of an interference cancellation circuit used to remove the interference signals from the second signal and (ii) spectral measurements based on the second signal; and
a processor configured to determine predicted energy-per-bit to noise-power-spectral-density ratio (Eb/N0) condition for a plurality of frequencies within the given frequency band using the STPR estimate and the spectral measurements.

17. The communication device according to claim 16, wherein the second signal comprises a total power including the first signal, the one or more interference signals, and the noise.

18. The communication device according to claim 16, wherein the processor is further configured to select a channel from a plurality of channels over which signals should be sent based on the predicted Eb/NO condition.

19. The communication device according to claim 18, wherein the transceiver is further configured to facilitate communication of information over the selected channel from the communication device.

20. The communication device according to claim 16, wherein the STPR estimate is a function of (i) a ratio $P_{ratio,exc}$ of an output signal power and an input signal power of an interference cancellation circuit and (ii) a mask ratio $M_{ratio,exc}$ representing a percentage of the first signal remaining from the second signal by the interference cancellation circuit.

21. The communication device according to claim 16, where the STPR estimate is set equal to $((P_{ratio,exc}/M_{ratio,exc})\cdot\gamma)/(\gamma+(R_c/R_b))$, where $\gamma$ is an Eb/N0 of the second signal after the interference cancellation circuit, $R_c$ is a chipping rate for the given channel, and $R_b$ is an information bit rate corresponding to $\gamma$.

22. The communication device according to claim 16, wherein the predicted Eb/N0 calculation includes removing a known power spectrum of the first signal from a relevant total spectral power measured at a receiver.

23. The communication device according to claim 22, wherein the known power of the first signal is obtained by multiplying the STPR estimate by a sum of a total spectrum over given Discrete Fourier Transform (DFT) bins.

24. The communication device according to claim 23, wherein the total spectral power is specified by summing the relevant spectral power estimates measured across the given frequency band as the second signal is being received.

25. The communication device according to claim 24, wherein the spectral power estimates comprise a Discrete Fourier Transform (DFT).

26. The communication device according to claim 24, wherein at least some of the spectral power estimates comprise information for the interference signals.

27. The communication device according to claim 24, wherein the spectral power estimates are scaled by the inverse of the duty cycles of the interference signals.

28. The communication device according to claim 27, wherein the scaled spectral power estimates are used to predict whether the interference cancellation circuit can excise a given interference signal of the interference signals from the second signal.

29. The communication device according to claim 28, wherein a power of the given interference signal is removed from the scaled spectral power estimates when a prediction is made that the interference cancellation circuit can excise the given interference signal from the second signal.

30. The communication device according to claim 16, wherein the predicted Eb/N0 condition is determined by:
estimating Eb by summing a pre-excision power spectrum centered at a given frequency and scaling the summation by a signal-to-total power ratio, which includes excision performance, and dividing the generated value by a bit rate; and
estimating N0 by summing a post-excision power spectrum over relevant bins to obtain a sum value, and dividing the sum value by a chip rate.

31. A communication device, comprising
a transceiver configured to receive signals transmitted over channels in frequency bands; and
a circuit configured to (i) determine multiple sets of spectral information and temporal information for each said frequency band, (ii) determine excision metrics for each said received signal, (iii) use the temporal information to determine interference signal information, and (iv) facilitate interference mitigation at another communication device using the sets of spectral information and temporal information, excision metrics and interference signal information.

32. The communication device according to claim 31, wherein the circuit is further configured to determine a Signal-to-Total Power Ratio (STPR) estimate based on a received signal including a signal of interest combined with at least one of noise and one or more interference signals, the STPR estimate accounts for at least one of (a) receiver performance including chip rate processing gain and (b) performance of an interference cancellation circuit used to remove the interference signals from the received signal.

33. The communication device according to claim 32, wherein the STPR estimate is a function of (i) a ratio $P_{ratio,exc}$ of an output signal power and an input signal power of an interference cancellation circuit and (ii) a mask ratio $M_{ratio,exc}$ representing a percentage of the first signal remaining from the second signal by the interference cancellation circuit.

34. The communication device according to claim 32, where the STPR estimate is set equal to $((P_{ratio,exc}/M_{ratio,exc})\cdot\gamma)/(\gamma+(R_c/R_b))$, where $\gamma$ is an Eb/N0 of the second signal after the interference cancellation circuit, $R_c$ is a chipping rate for the given channel, and $R_b$ is an information bit rate corresponding to $\gamma$.

35. The communication device according to claim 31, wherein the spectral information comprises a total spectral power of the received signal that is specified by spectral power estimates measured across a given frequency band as the signal is being received.

36. The communication device according to claim 35, wherein the spectral power estimates comprise a Discrete Fourier Transform (DFT).

37. The communication device according to claim 35, wherein at least some of the spectral power estimates comprise information for the interference signals.

38. The communication device according to claim 35, wherein the spectral power estimates facilitate a prediction as to whether the interference cancellation circuit can excise a given interference signal of the interference signals from the received signal.

\* \* \* \* \*